(12) United States Patent
Tanada et al.

(10) Patent No.: US 7,164,887 B2
(45) Date of Patent: Jan. 16, 2007

(54) RADIO COMMUNICATION DEVICE

(75) Inventors: Tosaku Tanada, Hino (JP); Kentaro Nagahama, Oume (JP); Hiroshi Matsuya, Hachiouji (JP); Takayasu Aoki, Machida (JP); Toshiya Tamura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 501 days.

(21) Appl. No.: 10/327,477

(22) Filed: Dec. 24, 2002

(65) Prior Publication Data

US 2003/0124979 A1 Jul. 3, 2003

(30) Foreign Application Priority Data

Dec. 28, 2001 (JP) .............................. 2001-399300
Mar. 15, 2002 (JP) .............................. 2002-072283

(51) Int. Cl.
*H04Q 7/20* (2006.01)
*H04B 7/00* (2006.01)

(52) U.S. Cl. ............... 455/41.2; 455/456.1; 455/343.2; 455/456.6; 455/440; 455/453

(58) Field of Classification Search ............... 455/41.2, 455/41.3, 435.1, 440, 453, 456.1, 456.6, 455/456.7, 500, 574, 343.1–343.5
See application file for complete search history.

(56) References Cited

U.S. PATENT DOCUMENTS

| | | | |
|---|---|---|---|
| 6,745,038 B1 * | 6/2004 | Callaway et al. | 455/456.1 |
| 6,901,275 B1 * | 5/2005 | Aoyagi | 455/574 |
| 2001/0012757 A1 | 8/2001 | Boyle | |
| 2002/0090914 A1 * | 7/2002 | Kang et al. | 455/41 |
| 2002/0094777 A1 * | 7/2002 | Cannon et al. | 455/41 |
| 2002/0142721 A1 * | 10/2002 | Souissi et al. | 455/41 |
| 2003/0124979 A1 * | 7/2003 | Tanada et al. | 455/41 |

FOREIGN PATENT DOCUMENTS

| | | |
|---|---|---|
| EP | 0 748 085 A1 | 12/1996 |
| JP | 09-116562 | 5/1997 |
| JP | 10-145276 | 5/1998 |
| JP | 10-155184 | 6/1998 |
| JP | 2000-138685 | 5/2000 |
| JP | 2000-151618 | 5/2000 |
| JP | 2001-103570 | 4/2001 |
| WO | WO 99/11081 | 3/1999 |
| WO | WO 01/03379 A1 | 1/2001 |

OTHER PUBLICATIONS

Suresh Singh et al., Electing Leaders Based Upon Performance: The Delay Model, 1991 IEEE, pp. 464-471.
European Search Report dated Mar. 23, 2006 for Application No. /Patent No. 02028836.1 - 2416.
Japanese Office Action dated May 17, 2006, Patent Application No. 2002-072283.

* cited by examiner

*Primary Examiner*—Edan Orgad
(74) *Attorney, Agent, or Firm*—Pillsbury Winthrop Shaw Pittman

(57) ABSTRACT

The positional relationship between a master terminal and a slave terminal and the positional relationship of the slave terminal with the master terminal and with other slave terminals are measured, and a slave terminal subject to switching to master terminal is selected using the positional relationship. A network is then reconstructed with the slave terminal subject to switching selected in this manner as the new master terminal, and as a result the terminals forming the network prior to switching are prevented from falling outside of the communication range of the new master terminal and short range radio communication is maintained with the same terminals as those prior to switching.

16 Claims, 19 Drawing Sheets

RADIO COMMUNICATION DEVICE

CROSS-REFERENCE TO THE RELATED APPLICATIONS

This application is based upon and claims the benefit of priority form the prior Japanese Patent Application Nos. 2001-399300 filed on Dec. 28, 2001 and 2002-72283 filed on Mar. 15, 2002; the entire contents of which are incorporated herein by reference.

BACKGROUND OF THE INVENTION

1. Field of the Invention

The present invention relates to radio communication devices constituting a system that forms a network in which a radio communication device operating as master terminal is connected to a plurality of radio communication devices operating as slave terminals using a short range radio communication function, and more specifically relates to radio communication devices in a radio communication system using these devices and method in which, when the master terminal or a slave terminal is disconnected from the network, the network is reconstructed with the same terminals, whereby short range radio communication can be performed favorably.

2. Description of the Related Art

Networks such as the Internet or Intranet, which transmit and receive data among information processing terminals such as personal computers or PDAs (Personal Digital Assistants), are constructed and used in various situations.

Networks are also often constructed using radio communication methods such as IrDA (Infrared Data Association) or Bluetooth (R) provided in communication terminals such as cellular phones, PDAs, and notebook computers.

Particularly in recent years, radio communication devices, which have a short range radio communication function such as Bluetooth and are capable of real time bidirectional communication among a plurality of terminals having the same function without passing through a server (online chat, for example), have been put to practical use.

In performing real time communication among a plurality of radio communication devices of this type, function setting is normally performed in one terminal in order for this terminal to operate as master terminal (master), and function setting is performed in the other terminals in order for these terminals to operate as slave terminals (slaves). The terminal set as master terminal then performs short range radio communication with the terminals set as slave terminals to thereby accommodate the slave terminals in a network with a star connection configuration.

As a specific example operating as a radio network constructed using Bluetooth, FIG. 1(a) shows a Piconet that performs two-way data communication in which one radio communication device (master terminal) 10-1 is connected one-to-one (point-to-point connection) with each of a plurality of radio communication devices (slave terminals) 10-2, 10-3, 10-4.

In the Piconet, once a radio communication device is initially designated as master terminal, it operates consistently as master terminal and performs control of the network until the network is abandoned.

Therefore, when online chat is performed by means of a radio connection among a plurality of cellular phones using Bluetooth, for example, the cellular phone which initially commences connection becomes the master terminal, and that terminal operates as master terminal until the chat session ends.

However, since the Piconet is a network in which the master terminal and the other terminals (slave terminals) are connected in point-to-point connection around the terminal initially designated as master terminal, the slave terminals only require control to perform point-to-point communication with the master terminal, whereas the master terminal requires multi-point connection control with the plurality of slave terminals. As a result, the communication load on the master terminal is extremely large and power consumption in the master terminal is much greater than in the other terminals.

Under this situation, battery power consumption in the master terminal becomes far greater than in the slave terminals, and hence the network cannot be maintained for a long period of time.

In order to solve this problem, a communication system is disclosed in Japanese Patent Application Laid-Open No. 2001-103570 (Japanese Patent Application H11-280649) in which the terminal set as master terminal receives battery information (remaining battery power and the like) from each of the terminals on the network which are set as slave terminals and from this battery information determines a terminal which is, to become the next master terminal. Then, when the conditions for master terminal/slave terminal switching are established, a master terminal/slave terminal switching command is transmitted to the terminal which is to become the next master terminal and thus the roles of master terminal and slave terminal are switched between terminals.

In this conventional system, however, upon determination of the terminal which is to become the next master terminal, the position of this terminal is not taken into account.

As a result, when the terminal with the largest remaining battery power is determined as the next master terminal (the terminal subject to switching), for example, the terminals forming the current network may not be included within the communication range of the terminal subject to switching.

In that event, in the network formed with the terminal subject to switching as the new master terminal, some terminals may come to fall outside of the communication range of the new master terminal, and thus communication cannot be performed among the same terminals as those in the network prior to switching.

As described above, as a method for dispersing the load on the master terminal to enable the construction of a long-term network, there was a method of having a master terminal determine the terminal with the greatest remaining battery power from among the terminals in a network as the terminal subject to switching and reconstructing the network with this terminal subject to switching as the new master terminal. In this method, however, a network which includes all of the terminals forming the current network cannot be reconstructed due to the positional relationship between the terminal subject to switching and the other terminals, and thus a problem arises in that short range radio communication among the same terminals as those prior to switching may not be maintainable.

Moreover, in the conventional communication system, it was the master terminal that performs control to determine the terminal subject to switching and reconstruct the network with the terminal subject to switching as the new master terminal, by issuing a master terminal/slave terminal switching command to the terminal subject to switching which is to become the next master terminal.

However, since a short range radio communication function such as Bluetooth which is installed in this type of radio communication device has a short transmission range and low transmission output, the master terminal may easily become disconnected from the network when, for example, a user carrying the master terminal sends and receives messages while in motion.

If the master terminal becomes disconnected from the network for such a reason, problems arise in the conventional system in that the network reconstruction control performed mainly by the master terminal in the network becomes impossible and the network cannot be reconstructed among the remaining terminals. As a result, communication cannot be maintained.

SUMMARY OF THE INVENTION

An object of the present invention is to provide a radio communication device, radio communication method, and radio communication system using these devices and method, wherein as many of the terminals forming the current network as possible are included in a communication range, a terminal whose conditions for communication with the other terminals in the communication range are as favorable as possible can be determined as a terminal subject to switching, and a network which includes the same terminals as those prior to switching is formed so that good short range radio communication can be maintained even after the switching to a new communication mode with the terminal subject to switching as the new master terminal.

Another object of the present invention is to provide a radio communication device, radio communication method, and radio communication system using these devices and method, wherein, even when the radio communication device operating as master terminal becomes disconnected from the network, the network can be reconstructed among the remaining terminals and short range radio communication can be maintained by having a terminal designated in advance so that a substitute master terminal become the new master terminal.

In order to achieve these objects, according to the present invention a radio communication device which operates as master terminal to form a network with another radio communication devices using a short range radio communication function comprises: a positional relationship measuring unit for measuring positional relationship between the master terminal and the radio communication devices operating as slave terminals; a switch timing judgment unit for judging the timing of a switch in communication mode using these positional relationship; a positional relationship information processing unit for requesting from the radio communication devices notification of positional relationship information indicating the positional relationship between these radio communication devices and each of the terminals forming the network, and receiving the positional relationship information notified by the radio communication devices; a switching subject terminal determining unit for selecting a radio communication device subject to switching using the positional relationship information; and a communication mode switching processing unit for switching to a communication mode in which the radio communication device subject to switching is set to operate as a new master terminal.

Also according to the present invention, a radio communication device which operates as slave terminal to form a network with another radio communication devices using a short range radio communication function comprises: a positional relationship measuring unit for measuring the positional relationship between the slave terminal itself and each of the terminals forming the network; a positional relationship information processing unit for notifying the radio communication device operating as master terminal of the positional relationship measured by the positional relationship measuring unit; and a communication mode switching processing unit for switching to a communication mode in which the slave terminal itself becomes master terminal in accordance with an instruction from the radio communication device operating as master terminal.

Also according to the present invention, the positional relationship measuring unit in a terminal which forms a network as slave terminal is constituted by means for measuring as these positional relationship the number of terminals included within the communication range of this slave terminal and the distance between this slave terminal and the other terminals included within the communication range thereof.

According to this configuration, a slave terminal transmits to the master terminal positional relationship information comprising the number of terminals included in the communication range of this slave terminal and the distance between this slave terminal and the terminals included within the communication range thereof In the master terminal, the terminal with the largest possible number of terminals which form the current network included in the communication range thereof and with the shortest distances to the other terminals in the communication range thereof, or in other words the terminal with superior communication conditions, is determined as the terminal subject to switching.

Hence, following a switch to a communication mode with the terminal subject to switching as a new master terminal, short range radio communication with a high level of communication quality can be maintained in a network formed from the same terminals as those prior to switching.

Also according to the present invention, a radio communication device which operates as master terminal to form a network with another radio communication devices using a short range radio communication function comprises: a positional relationship measuring unit for measuring positional relationship between the master terminal itself and the radio communication devices operating as slave terminals; a positional relationship information processing unit for requesting from these radio communication devices notification of positional relationship information indicating the positional relationship between these radio communication devices and each of the terminals forming the network, and receiving the positional relationship information notified by the radio communication devices; a remaining battery power measuring unit for measuring the remaining battery power of the master terminal itself; a battery information processing unit for requesting from the radio communication devices notification of battery information indicating the remaining battery power, and receiving the battery information notified by the radio communication devices; a switch timing judgment unit for judging the timing of a switch of communication mode using the positional relationship and battery information; a switching subject terminal determining unit for selecting a radio communication device subject to switching using the positional relationship information and battery information; and a communication mode switching processing unit for switching to a communication mode in which the radio communication device subject to switching is set to operate as a new master terminal.

Also according to the present invention, a radio communication device which operates as slave terminal to form a network with another radio communication devices using a short range radio communication function comprises: a positional relationship measuring unit for measuring the positional relationship between the slave terminal itself and each of the terminals forming the network; a positional relationship information processing unit for notifying the radio communication device operating as master terminal of the positional relationship measured by the positional relationship measuring unit; a remaining battery power measuring unit for measuring the remaining battery power of the slave terminal itself; a battery information processing unit for notifying the radio communication device operating as master terminal of the remaining battery power measured by the remaining battery power measuring unit; and a communication mode switching processing unit for switching to a communication mode in which the slave terminal itself becomes master terminal in accordance with an instruction from the radio communication device operating as master terminal.

On the basis of the positional relationship information and battery information received from the slave terminals, the master terminal is able to determine the terminal with the largest possible number of terminals forming the current network included in the communication range thereof, the shortest distances to the other terminals in the communication range thereof, and the greatest remaining battery power, for example, as the terminal subject to switching.

Thus, following a switch to a communication mode with this terminal subject to switching as a new master terminal, short range radio communication with a high level of communication quality can be maintained over a long period of time in a network formed from the same terminals as those prior to switching.

Also according to the present invention, a portable radio terminal device used in a radio communication system for forming a network in which a radio communication device operating as master terminal and a plurality of radio communication devices operating as slave terminals are connected using a short range radio communication function, this portable radio terminal device operating as the master terminal or the slave terminal in accordance with pre-performed function setting, comprises when operating as the master terminal: substitute designation information transmission means for transmitting to an arbitrary slave terminal substitute designation information designating this slave terminal as a substitute master terminal; and configuration information transmission means for transmitting network configuration information regarding the current network to the slave terminal to which the substitute designation information was transmitted; and comprises when operating as a slave: reception means for receiving the substitute designation information and network configuration information from the master terminal; disconnection detection means for detecting the disconnection of the master terminal from the network following reception of the substitute designation information and network configuration information; and communication mode switching processing means for switching settings from a function setting for operating as slave terminal to a function setting for operating as master terminal when the master terminal is disconnected from the network, and thereby switching to a communication mode with the slave terminal itself as master terminal.

According to the radio communication system using a radio communication device with this configuration, an arbitrary slave terminal is designated in advance by the master terminal as a substitute master terminal, and thus, when the master terminal is subsequently disconnected from the network and a network management function is lost, the terminal which was previously designated as substitute becomes master terminal and a network is reconstructed among the remaining slave terminals. Thus communication can be maintained.

BRIEF DESCRIPTION OF THE DRAWINGS

In the accompanying drawings.

DESCRIPTION OF THE PREFERRED EMBODIMENTS

Embodiments of the present invention will be described in detail below with reference to the attached drawings.

Figure 1A:
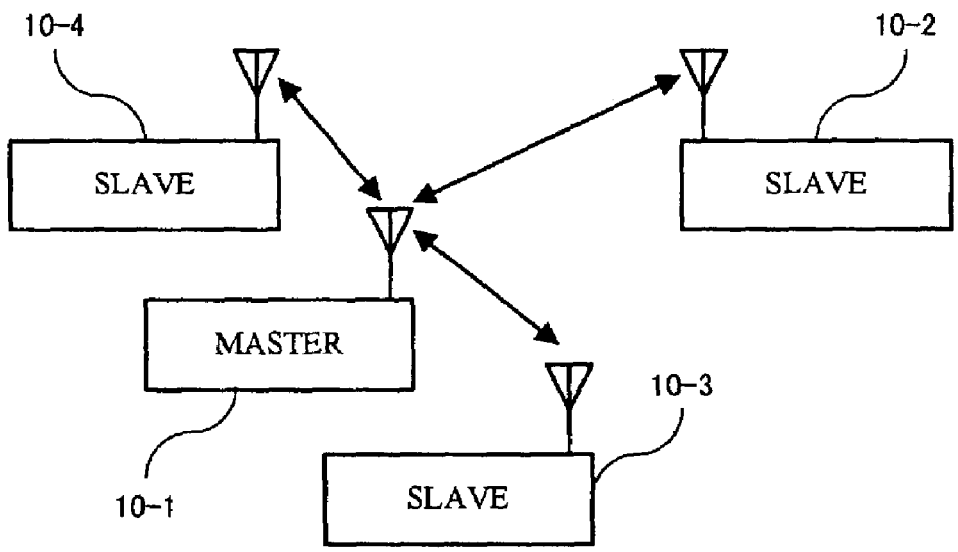
FIGS. 1(a) and 1(b) are conceptual diagrams of the configuration of a radio communication system according to an embodiment of the present invention.
Figure 2:
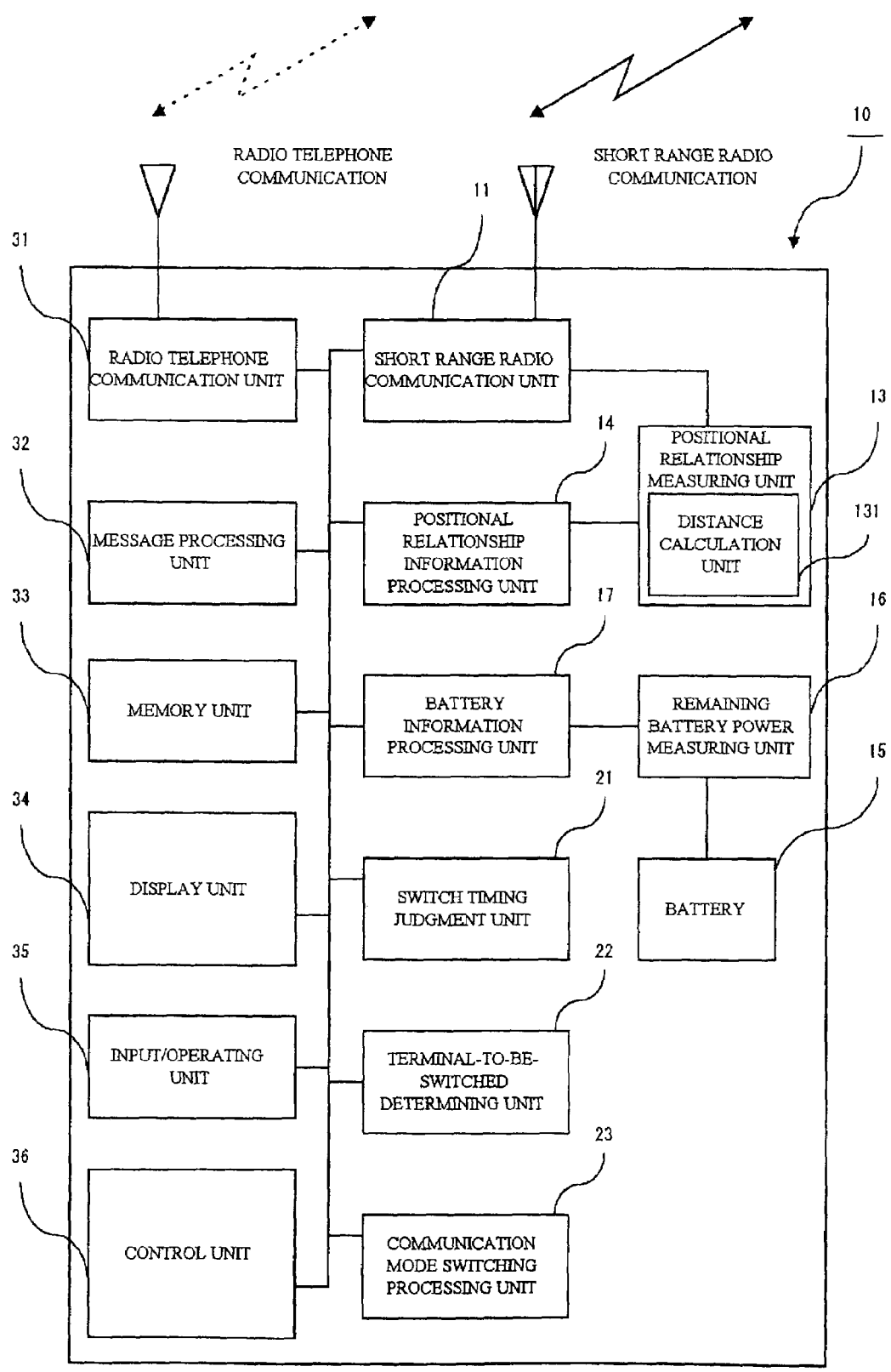
FIG. 2 is a block diagram illustrating the configuration of a radio communication device according to an embodiment of the present invention.

FIGS. 1(a) and (b) are conceptual diagrams of the configuration of a radio communication system of the present invention, and FIG. 2 is a schematic block diagram illustrating the configuration of a radio communication device according to the present invention.

Figure 1B:
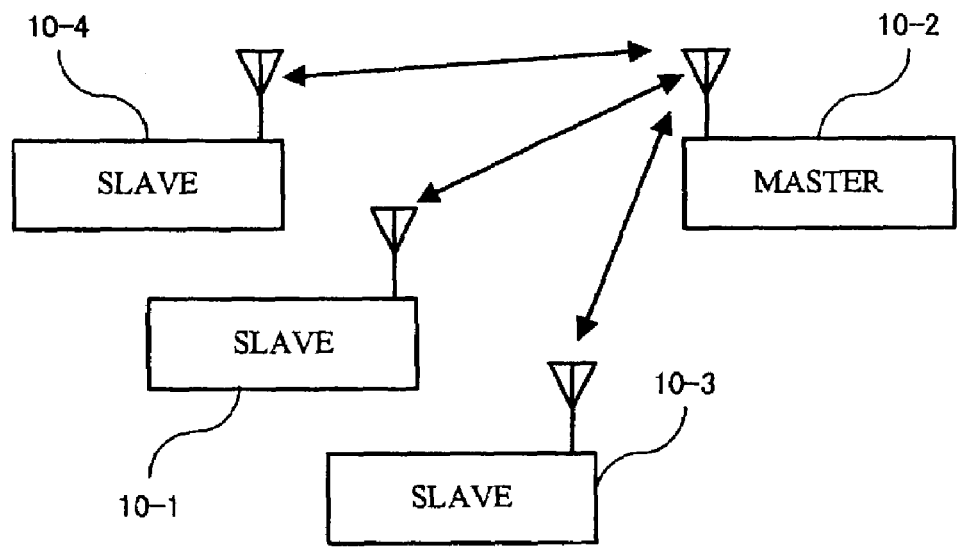

The radio communication system of the present invention, as is illustrated in FIG. 1(a), is constituted in a network which is constructed with one radio communication device 10-1 operating as master terminal and the another radio communication devices 10-2, 10-3, 10-4 operating as slave terminals such that when the remaining battery power of the radio communication device 10-1 operating as the master terminal decreases and the remaining battery power of the radio communication device 10-2, for example, operating as slave terminal becomes the greatest in the network, the network is constructed with the radio communication device 10-2 as the master terminal, as is illustrated in FIG. 1(b).

As is illustrated in FIG. 2, a radio communication device 10 of the present invention is provided with a short range radio communication unit 11 for performing short range radio communication with another radio communication devices, a positional relationship measuring unit 13 for measuring positional relationship with another radio communication devices, a positional relationship information processing unit 14 for processing information regarding these positional relationship, a battery 15 which operates as a power source, a remaining battery power measuring unit 16 for measuring the remaining electricity in the battery 15, a battery information processing unit 17 for processing information regarding the remaining electricity in the battery, a switch timing judgment unit 21 for judging the timing of a switch in the communication functions of the master terminal and slave, a switching subject terminal determining unit 22 for determining a slave terminal which is to become the new master terminal, a communication mode switching processing unit 23 for performing switching processing of the communication mode between the master terminal and slave, a radio telephone communication unit 31 realized by a digital radio telephone such as CDMA for performing radio telephone communication with other radio telephone devices via a radio telephone base station (not shown), a message processing unit 32 for performing processing such as creation, display, and saving of messages which are transmitted and received during a message exchange session established through short range radio communication or the like, a memory unit 33 for storing various types of information such as messages and operational control information, a display unit 34 for displaying various types of information such as messages transmitted and received during a message exchange session, an input/operating unit 35 for inputting various types of information (messages, various operating instructions, and so on) by manipulating various keys such as a numeric keypad, and a control unit 36 for performing control of the entire radio communication device.

Here, the short range radio communication unit 11 is a Bluetooth communication module which is capable of radio communication with other terminals installed with a Bluetooth communication module according to Bluetooth specifications.

The positional relationship measuring unit 13 measures the positional relationship between the terminal in which the unit 13 is comprised and other terminals by performing a device search using the short range radio communication unit 11, or in other words Bluetooth, to determine how many of the terminals which form a network are included within a communication range centered on this terminal.

The positional relationship measuring unit 13 is also provided with a distance calculation unit 131 for calculating the distances between the terminal in which this unit 13 is comprised and each of the terminals within the communication range centered on this terminal using the receive signal strength intensity (RSSI) during communication with these terminals.

Thus the positional relationship measuring unit 13 not only comprises a function for measuring as the positional relationship between the terminal in which the unit 13 is comprised and other terminals how many of the terminals forming a network are within the communication range centering on this terminal, but also comprises a function for measuring the distance between this terminal and the other terminals within the communication range thereof.

When comprised in the master terminal, the positional relationship information processing unit 14 measures the positional relationship between the master terminal and the other terminals at constant intervals using the positional relationship measuring unit 13 and also requests positional relationship information from the slave terminals and receives the responses to such requests.

When comprised in a slave terminal, on the other hand, having received a positional relationship, information notification request from the master terminal, the positional relationship information processing unit 14 measures the positional relationship between the slave terminal itself and the master terminal and the slave terminal itself and the other terminals using the positional relationship measuring unit 13 and transmits this positional relationship information to the master terminal.

Figure 9:
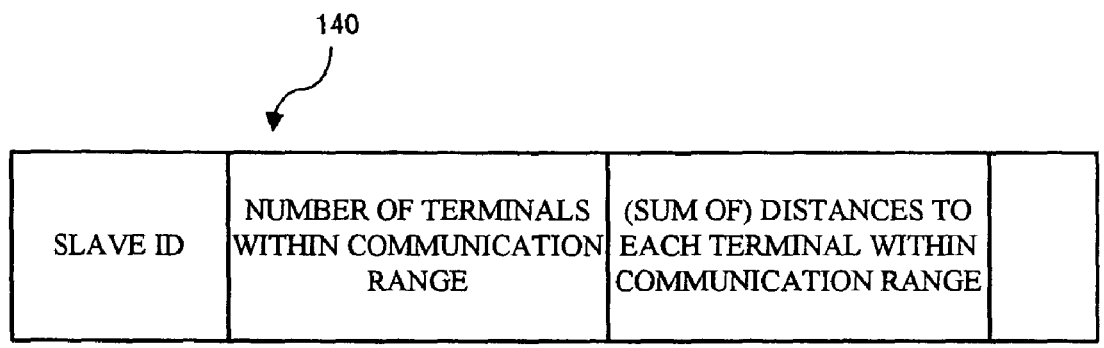
FIG. 9 is a view illustrating the configuration of positional relationship information transmitted to a master terminal from a slave.

Here, the positional relationship information transmitted from a slave terminal to the master terminal comprises information regarding the number of terminals included within the communication range of the slave terminal and information regarding the distances between the slave terminal and each of the terminals within the communication range thereof (see FIG. 9).

When comprised in the master terminal, the battery information processing unit 17 measures the remaining battery power of the battery 15 in the master terminal at constant intervals using the remaining battery power measuring unit 16, and also requests information regarding remaining battery power from the slave terminals and receives the responses to such requests.

When comprised in a slave terminal, on the other hand, having received a remaining battery power notification request from the master terminal, the battery information processing unit 17 measures the remaining battery power of the battery 15 in this slave terminal using the remaining battery power measuring unit 16 and transmits this information to the master terminal.

The switch timing judgment unit 21 judges the timing of a switch in master terminal to the communication function of a slave terminal on the basis of the remaining battery power measured by the remaining battery power measuring unit 16 or the positional relationship information measured by the positional relationship measuring unit 13.

The switching subject terminal determining unit 22 determines the terminal subject to switching of the master terminal to a slave terminal communication function on the basis of the remaining battery power of the slave terminals obtained by the battery information processing unit 17 or the positional relationship information of the slave terminals obtained by the positional relationship information processing unit 14.

When the switch timing judgment unit 21 judges that it is time to switch the master terminal to a slave terminal communication function and the switching subject terminal determining unit 22 determines the terminal subject to switching, communication mode switching processing unit 23 performs processing to switch the communication modes of the subject slave terminal and master terminal.

Here, the communication mode of the master terminal signifies communication with each of the slave terminals, and the communication mode of the slave terminals signifies communication with the master terminal.

Note that in this embodiment, a Bluetooth system is used as radio communication means. However, the communication means are not limited to a Bluetooth system and another system may be used to perform radio communication.

Further, any information which is capable of identifying individual terminals connected in a network, such as the telephone number of a cellular phone or the ID, IP addresses provided in individual devices may be used as an identifier of a radio communication device.

Figure 3:
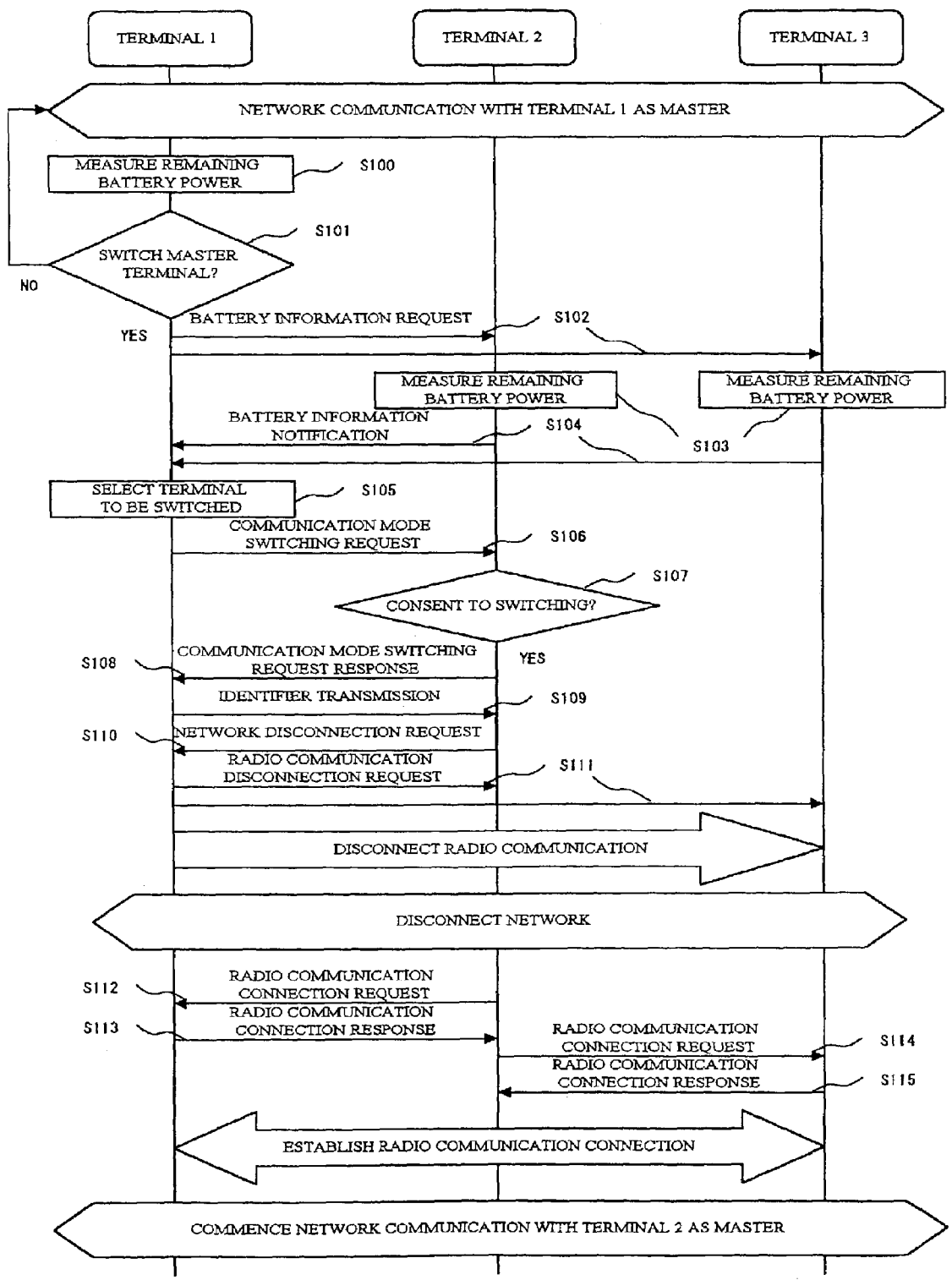
FIG. 3 is a flowchart illustrating the sequence of a communication mode switching method in a first embodiment.

FIG. 3 is a flowchart illustrating a communication mode switching sequence between master terminal and slave terminal based on remaining battery power in a communication mode switching method according to the first embodiment.

In FIG. 3 in this embodiment, a network is initially connected with terminal 1 as the master terminal and terminal 2 and terminal 3 as slave terminals. Note that terminals 1, 2, 3 use radio communication devices 10 having the configuration illustrated in FIG. 2.

During communication in a network with terminal 1 as the master terminal, the remaining battery power of the master terminal is measured at constant intervals (step S100) and a judgment is made as to whether or not the master terminal is subject to switching (step S101).

Here, if the remaining battery power exceeds a constant value, or if the decrease value of the remaining battery power is less than a constant value, it is judged that it is not time to switch communication mode (NO in step S101) and the network with terminal 1 as master terminal and terminal 2 and terminal 3 as slave terminals is maintained.

If the remaining battery power is equal to or below a constant value, or if the decrease value of the remaining battery power is equal to or greater than a constant value, it is judged to be time to switch communication mode (YES in step S101) and the master terminal requests battery information from the slave terminals (step S102).

The slave terminals measure their remaining battery power (step S103) and notify the master terminal of the battery information (step S104). In the master terminal, the notified battery information is used to select the slave terminal with the greatest remaining battery power as the terminal subject to switching (step S105).

In this embodiment, the remaining battery power of terminal 2 is assumed to be the greatest, and therefore terminal 2 is selected as the terminal subject to switching.

Then, a communication mode switching request is transmitted to terminal 2, which is the slave terminal subject to switching (step S106), whereupon a judgment is made in terminal 2 as to whether consent to switching will be given (step S107).

Here, if consent to switching is given (YES in step S107), a response to the communication mode switching request is transmitted (step S108) and the master terminal transmits identifiers for the terminals forming the network to the slave terminal subject to switching (step S109).

Then, when a network disconnection request is received from the slave terminal subject to switching (step S110), a network disconnection request is transmitted to each of the terminals (step S111) and the network is disconnected.

Upon disconnection of the network, terminal 2, which is the slave terminal subject to switching, transmits a connection request to any one of the terminals forming the network (step S112), and having received a response regarding radio communication connection from that terminal (step S113), transmits a connection request to another one of the terminals forming the network (step S114). Once a response regarding radio communication connection is received from this terminal (step S115), the network is reconnected with the terminal itself (terminal 2) as master terminal.

With this reconnection, the communication mode of terminal 1 is switched from a communication mode as master terminal to a communication mode as slave terminal, and the communication mode of terminal 2 is switched from a communication mode as slave terminal to a communication mode as master terminal. Thus network communication with terminal 2 as master terminal commences.

Note that in the first embodiment, a response is only provided when consent is given to the switch, but a configuration may be provided in which this consent is given not only according to the judgment of the user of the terminal subject to switching but may also be given automatically if a terminal fulfills sufficient conditions to function as master terminal.

A configuration may also be provided in which, if a response to a switching request is not obtained within a set amount of time, it is judged that consent has not been given, whereupon the slave terminal with next greatest remaining battery power is selected as the switching subject and a communication mode switching request is transmitted to the newly selected terminal.

Thus in the first embodiment, the slave terminal with the greatest remaining battery power becomes the new master terminal, and therefore network disconnection due to batteries dying can be prevented and a network constituted by the same terminals can be maintained long-term.

Further, since switching is performed after consent is obtained from the terminal subject to switching, switching may be refused in cases where the subject terminal is not suitable to operate as master terminal, such as when the subject terminal is running an application with a large amount of information or does not possess sufficient ability to function as master terminal. As a result, a network may be formed with an appropriate terminal as master terminal.

In the first embodiment, switching is performed after consent is obtained from the terminal subject to switching, but switching may be performed without obtaining consent, and this method will be described below using a second embodiment.

Figure 4:
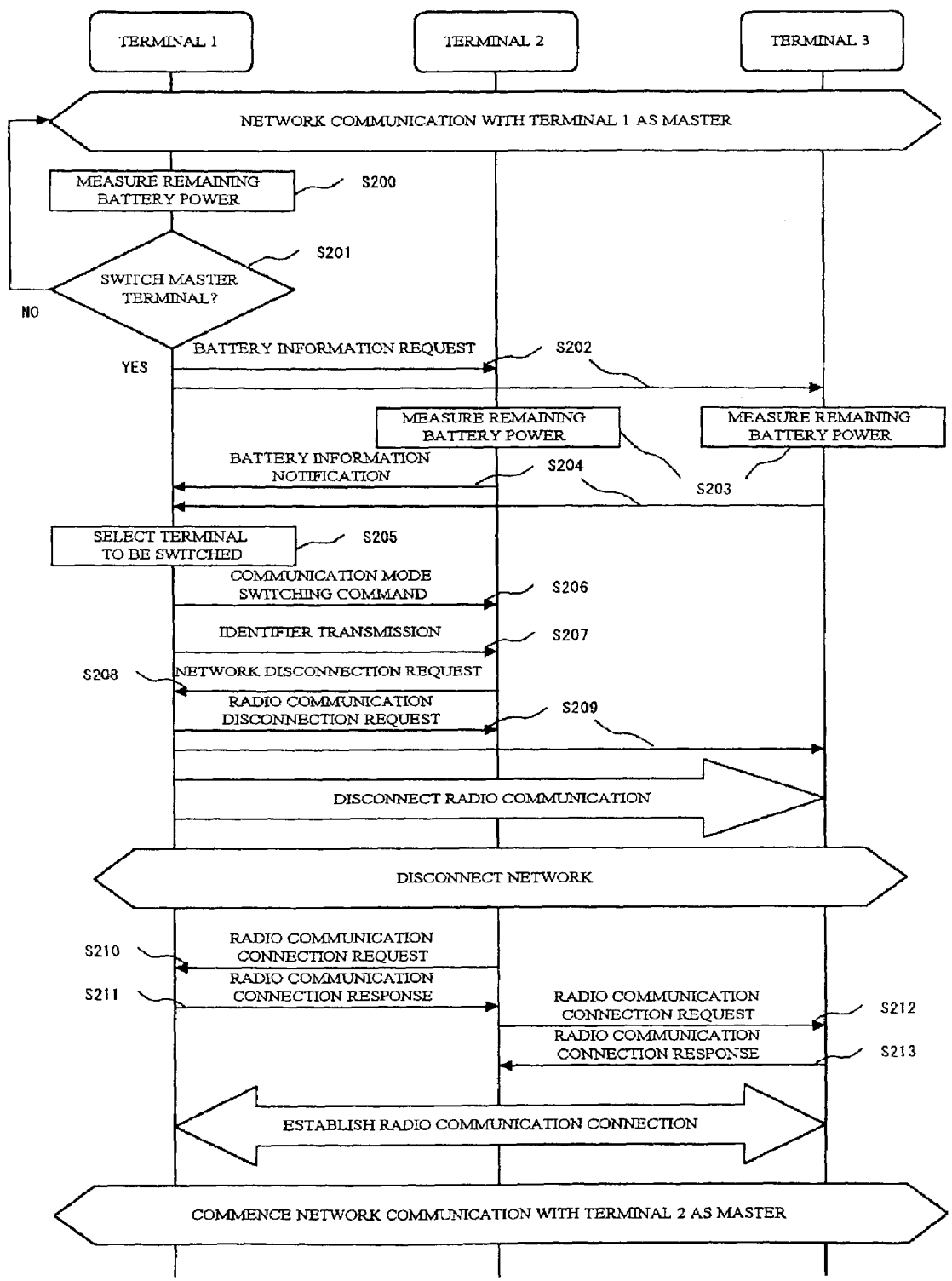
FIG. 4 is a flowchart illustrating the sequence of a communication mode switching method in a second embodiment.

FIG. 4 is a flowchart illustrating a communication mode switching sequence between master terminal and slave terminal based on remaining battery power in a communication mode switching method according to the second embodiment.

In FIG. 4 in this embodiment, a network is initially connected with terminal 1 as the master terminal and terminal 2 and terminal 3 as slave terminals. Terminals 1, 2, 3 use radio communication devices 10 having the configuration illustrated in FIG. 2.

During communication in a network with terminal 1 as the master terminal, the master terminal measures its remaining battery power at constant intervals (step S200) and judges whether or not the master terminal is subject to switching (step S201).

Here, if the remaining battery power exceeds a constant value, or if the decrease value of the remaining battery power is less than a constant value, it is judged that it is not time to switch communication mode (NO in step S201) and the network with terminal 1 as master terminal and terminals 2 and 3 as slave terminals is maintained.

If the remaining battery power is equal to or below a constant value, or if the decrease value of the remaining battery power is equal to or greater than a constant value, it is judged to be time to switch communication mode (YES in step S201) and the master terminal requests battery information from the slave terminals (step S202).

The slave terminals measure their remaining battery power (step S203) and notify the master terminal of the battery information (step S204). In the master terminal, the notified battery information is used to select the slave terminal with the greatest remaining battery power as the terminal subject to switching (step S205).

In this embodiment, the remaining battery power of terminal 2 is assumed to be the greatest, and therefore terminal 2 is selected as the terminal subject to switching.

A communication mode switch command is then transmitted to terminal 2, which is the slave terminal subject to switching (step S206), and identifiers for the terminals forming the network are also transmitted thereto (step S207).

When a network disconnection request is received from the slave terminal subject to switching (step S208), a network disconnection request is transmitted to each slave terminal (step S209) and the network is disconnected.

Upon disconnection of the network, terminal 2, which is the slave terminal subject to switching, transmits a connection request to any one of the terminals forming the network (step S210), and having received a response regarding radio communication connection from that terminal (step S211), transmits a connection request to another one of the terminals forming the network (step S212). Once a response regarding radio communication connection is received from this terminal (step S213), the network is reconnected with the terminal itself (terminal 2) as master terminal.

With this reconnection, the communication mode of terminal 1 is switched from master terminal to slave terminal and the communication mode of terminal 2 is switched from slave terminal to master terminal. Thus network communication with terminal 2 as master terminal commences.

In the second embodiment, the slave terminal with the greatest remaining battery power becomes the new master terminal, and thus network disconnection due to batteries dying can be prevented and a network constituted by the same terminals can be maintained long-term.

Further, since consent from the terminal subject to switching is not necessary, a network can be formed with an appropriate terminal as master terminal without placing a load upon the user of the subject terminal.

Figure 5A:
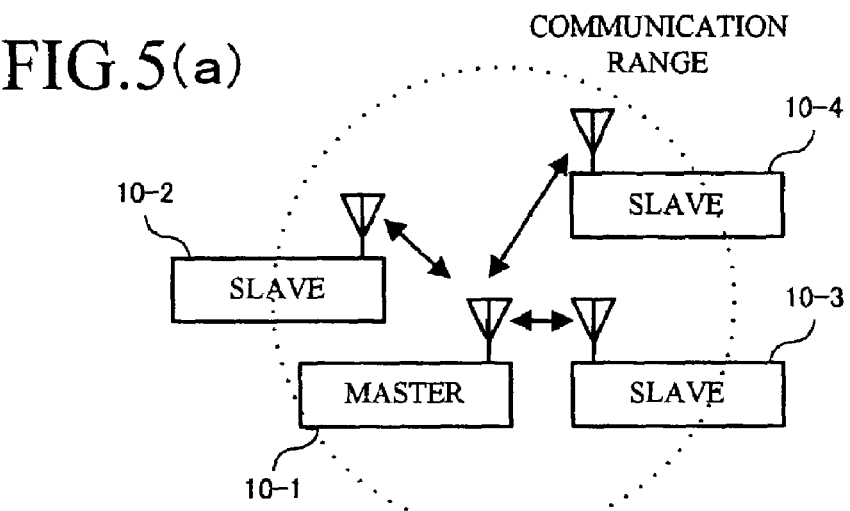
FIGS. 5(a) through 5(c) are conceptual diagrams of the configuration of a radio communication system according to the present invention.

However, as is illustrated in FIG. 5(a), this network is formed by the point-to-point connection of the radio communication device 10-1 operating as master terminal with the radio communication devices 10-2, 10-3, 10-4 operating as slave terminals using short range radio communication.

Figure 5B:
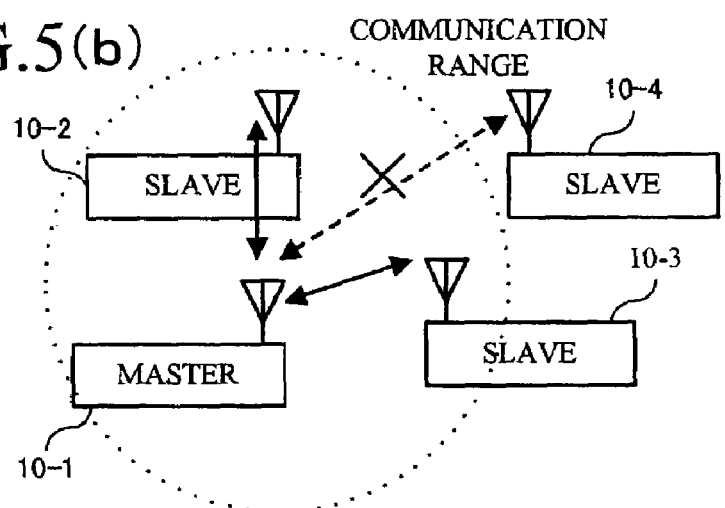

Hence, as is illustrated in FIG. 5(b), if the radio communication device 10-1 operating as master terminal moves, for example, the communication range for connecting with the master terminal moves in accordance with this movement and the radio communication device 10-4, which is a slave terminal that has fallen outside of the communication range, is forcibly disconnected from the network.

Figure 5C:
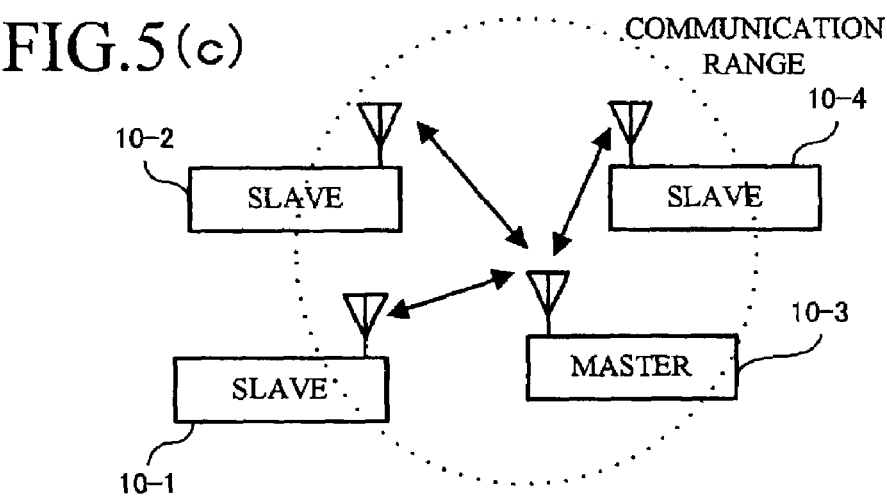

Thus, a radio communication method in which a slave terminal which is capable of communicating with each terminal is switched to master terminal, as is illustrated in FIG. 5(c), will be described as a third embodiment.

Figure 6:
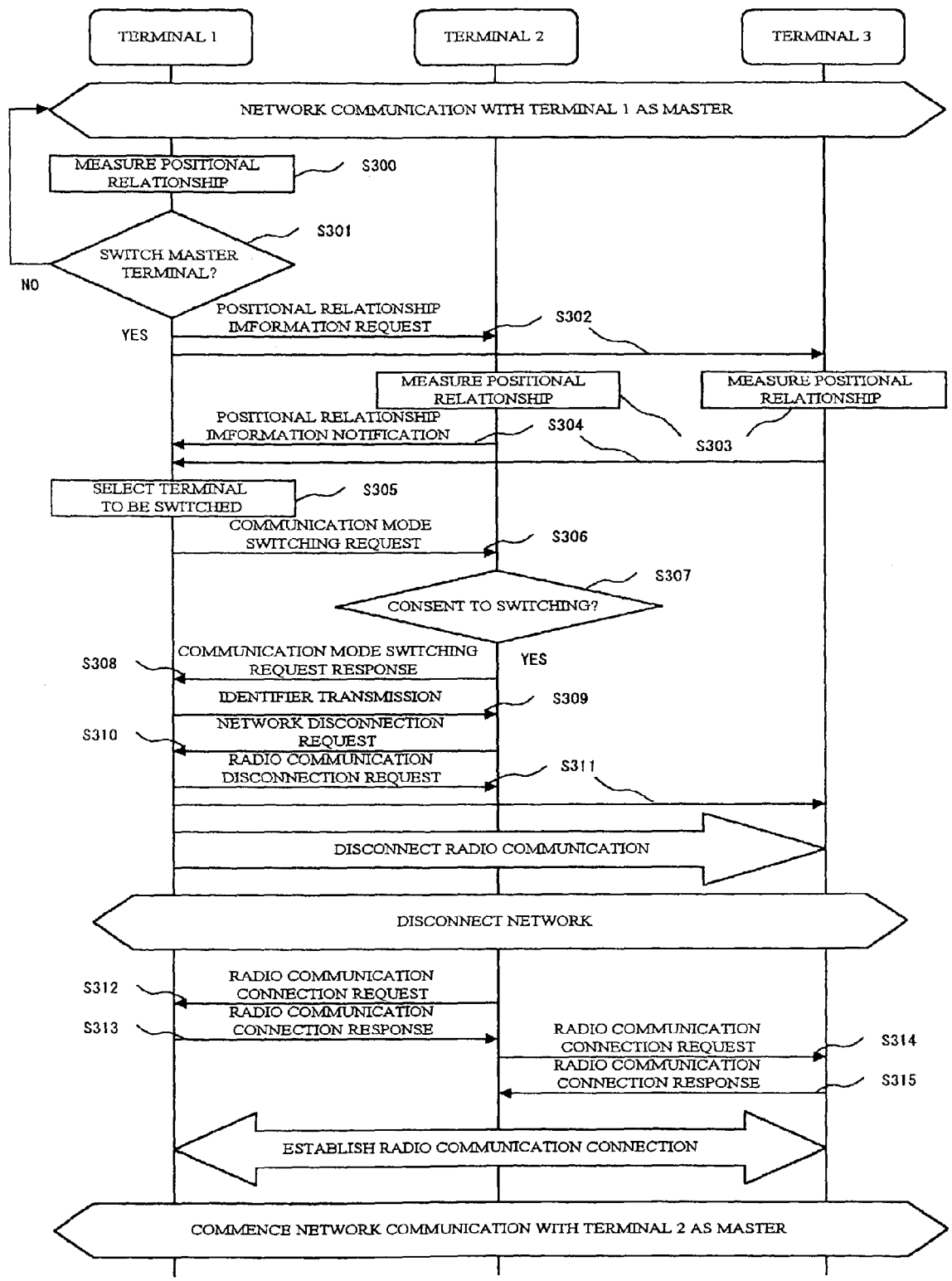
FIG. 6 is a flowchart illustrating the sequence of a communication mode switching method in a third embodiment.

FIG. 6 is a flowchart illustrating a communication mode switching sequence between master terminal and slave terminal based on the positional relationship of each terminal in the communication mode switching method according to the third embodiment.

In FIG. 6 in this embodiment, a network is initially connected with terminal 1 as the master terminal and terminals 2 and 3 as slave terminals. Terminals 1, 2, 3 use radio communication devices 10 having the configuration illustrated in FIG. 2.

During communication in a network with terminal 1 as the master terminal, the master terminal measures its positional relationship at constant intervals (step S300) and judges whether or not the master terminal is subject to switching (step S301).

Here, if all of the slave terminals are within the communication range of the master terminal, it is judged that it is not time to switch communication mode (NO in step S301) and the network with terminal 1 as master terminal and terminals 2 and 3 as slave terminals is maintained.

If the position of any of the slave terminals is outside of the communication range of the master terminal, it is judged to be time for switching communication mode (YES in step S301) and the master terminal requests positional relationship information from the slave terminals (step S302).

The slave terminals measure their positional relationship (step S303) and notify the master terminal of the positional relationship information (step S304). From the notified positional relationship information, the master terminal selects the terminal which includes the largest number of network-forming terminals within the communication range thereof as the terminal subject to switching (step S305).

In this embodiment, it is assumed that the largest number of network-forming terminals is included within the communication range of terminal 2, and therefore terminal 2 is selected as the terminal subject to switching.

A communication mode switching request is then transmitted to terminal 2, which is the slave terminal subject to switching (step S306), whereupon a judgment is made in terminal 2 as to whether consent to switching shall be given (step S307).

If consent to switching is given (YES in step S307), a response to the communication mode switching request is transmitted (step S308) and the master terminal transmits the identifiers of the terminals forming the network to the slave terminal subject to switching (step S309).

Then, when a network disconnection request is received from the slave terminal subject to switching (step S310), a network disconnection request is transmitted to each terminal (step S311) and the network is disconnected.

Upon disconnection of the network, terminal 2, which is the slave terminal subject to switching, transmits a connection request to any one of the terminals forming the network (step S312), and having received a response regarding radio communication connection from that terminal (step S313), transmits a connection request to another one of the terminals forming the network (step S314). Once a response regarding radio communication connection is received from this terminal (step S315), the network is reconnected with the terminal itself (terminal 2) as master terminal.

With this reconnection, the communication mode of terminal 1 is switched from a communication mode as master terminal to a communication mode as slave terminal, and the communication mode of terminal 2 is switched from a communication mode as slave terminal to a communication mode as master terminal. Thus network communication with terminal 2 as master terminal commences.

Thus in the third embodiment, the slave terminal with the largest number of network-forming terminals in its communication range becomes the new master terminal, and hence network disconnection accompanying the movement of a terminal is prevented and a network constituted by the same terminals can be maintained long-term.

Further, since switching is performed after obtaining consent from the terminal subject to switching, switching may be refused when the slave terminal subject to switching is not suitable to operate as master terminal, and thus a network may be formed with an appropriate terminal as master terminal.

In the third embodiment, switching is performed after consent is obtained from the terminal subject to switching, but switching may be performed without obtaining consent, and this method will be described below using a fourth embodiment.

Figure 7:
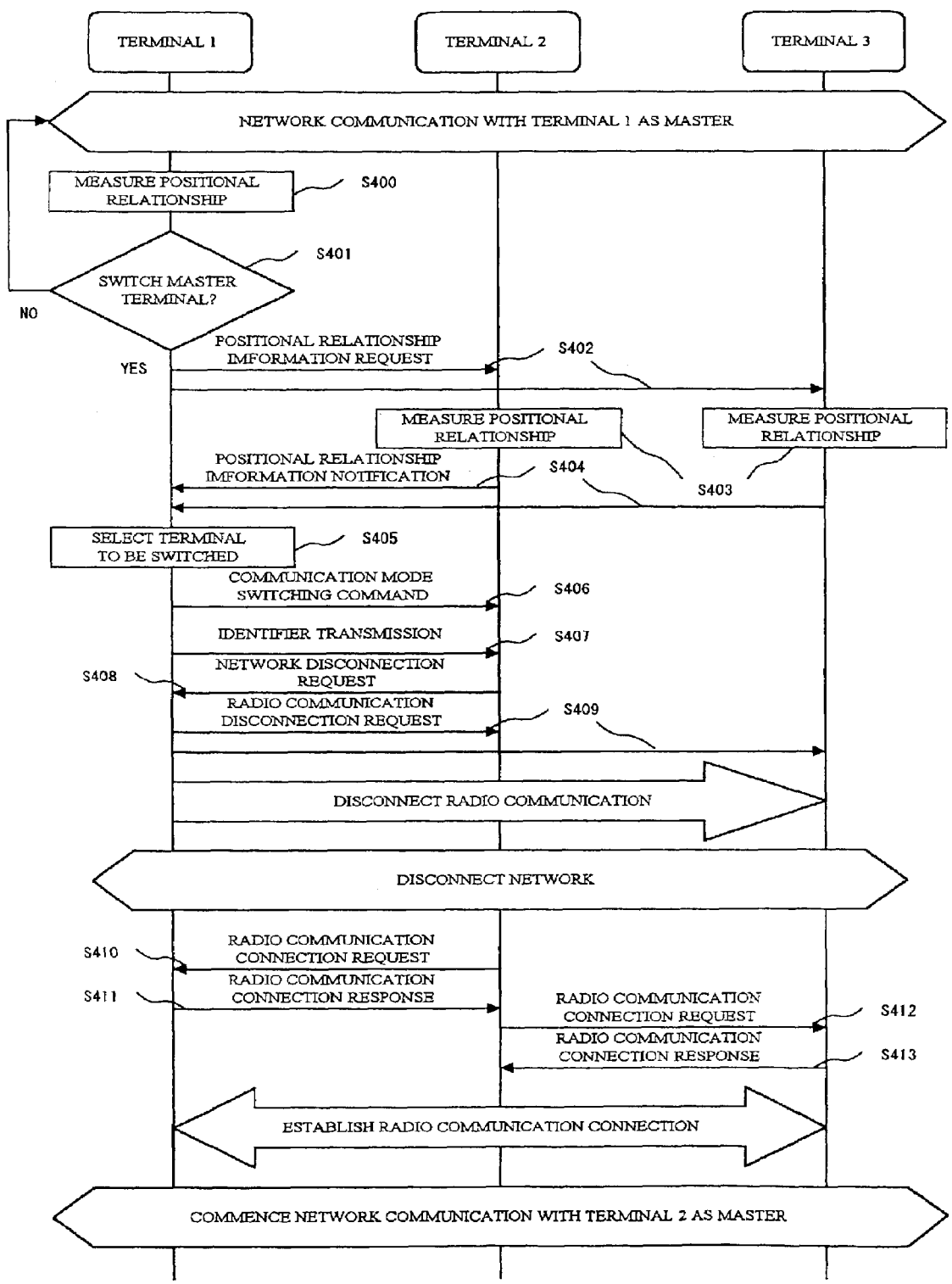
FIG. 7 is a flowchart illustrating the sequence of a communication mode switching method in a fourth embodiment.

FIG. 7 is a flowchart illustrating a communication mode switching sequence between master terminal and slave terminal based on the positional relationship of each terminal in the communication mode switching method according to the fourth embodiment.

In FIG. 7 in this embodiment, a network is initially connected with terminal 1 as the master terminal and terminals 2 and 3 as slave terminals. Terminals 1, 2, 3 use radio communication devices 10 having the configuration illustrated in FIG. 2.

During communication in a network with terminal 1 as the master terminal, the master terminal measures its positional relationship at constant intervals (step S400) and judges whether or not the master terminal is subject to switching (step S401).

Here, if all of the slave terminals are within the communication range of the master terminal, it is judged that it is not time to switch communication mode (NO in step S401) and the network with terminal 1 as master terminal and terminals 2 and 3 as slave terminals is maintained.

If the position of any of the slave terminals is outside of the communication range of the master terminal, it is judged to be time for switching communication mode (YES in step S401) and the master terminal requests positional relationship information from the slave terminals (step S402).

The slave terminals measure their positional relationship (step S403) and notify the master terminal of the positional relationship information (step S404). From the notified positional relationship information, the master terminal selects the slave terminal which includes the largest number of network-forming terminals within the communication range thereof as the terminal subject to switching (step S405).

In this embodiment, it is assumed that the largest number of network-forming terminals is included within the communication range of terminal 2, and therefore terminal 2 is selected as the terminal subject to switching.

A communication mode switch command is then transmitted to terminal 2, which is the slave terminal subject to switching (step S406), and identifiers for the terminals forming the network are also transmitted thereto (step S407).

When a network disconnection request is received from the slave terminal subject to switching (step S408), a network disconnection request is transmitted to each slave terminal (step S409) and the network is disconnected.

Upon disconnection of the network, terminal 2, which is the slave terminal subject to switching, transmits a connection request to any one of the terminals forming the network (step S410), and having received a response regarding radio communication connection from that terminal (step S411), transmits a connection request to another one of the terminals forming the network (step S412). Once a response regarding radio communication connection is received from this terminal (step S413), the network is reconnected with the terminal itself (terminal 2) as master terminal.

With this reconnection, the communication mode of terminal 1 is switched from master terminal to slave terminal and the communication mode of terminal 2 is switched from slave terminal to master terminal. Thus network communication with terminal 2 as master terminal commences.

Thus in the fourth embodiment, the slave terminal with the largest number of network-forming terminals in its communication range becomes the new master terminal, and hence network disconnection accompanying the movement of a terminal is prevented and a network constituted by the same terminals can be maintained long-term.

Further, since consent from the terminal subject to switching is not necessary, a network can be formed with an appropriate terminal as master terminal without placing a load upon the user of the subject terminal.

Note that in the third and fourth embodiments, only information concerning the number of terminals included within the communication range of each slave terminal is noted as the positional relationship information received by the master terminal from the slave terminals, but information regarding the distance from each terminal to the terminals in the communication ranges thereof may also be used as this positional relationship information.

Operations for gathering positional relationship information, including distance information, and a method for determining the terminal subject to switching using this distance information, will now be described.

Figure 8A:
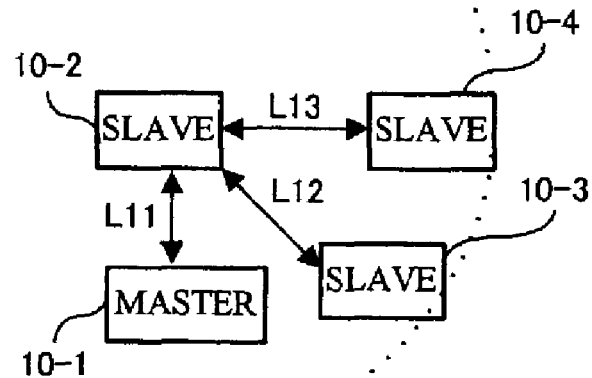
FIGS. 8(a) and (b) are conceptual diagrams of an operation for calculating the distance between each terminal and the terminals within the communication ranges thereof.
Figure 8B:
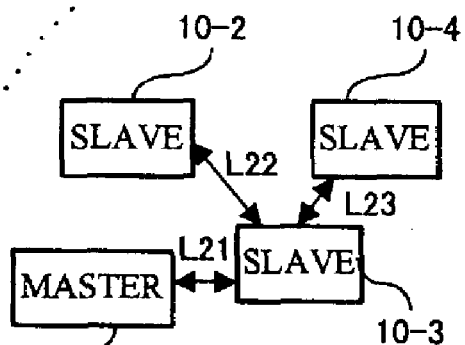

FIGS. 8(*a*) and 8(*b*) are conceptual diagrams of an operation for calculating the distances between the terminals within the communication range of each slave.

Specifically, FIG. 8(*a*) illustrates the calculation of the distance between the slave terminal 10-2 in FIG. 5(*b*) and the other terminals within the communication range thereof, and FIG. 8(*b*) illustrates the calculation of the distance between the slave terminal 10-3 in FIG. 5(*b*) and the other terminals within the communication range thereof.

In FIG. 8(*a*), the slave terminal 10-2 uses the distance calculation unit 131 of the positional relationship measuring unit 13 to respectively calculate (estimate) the distances L11, L12, L13 from the slave terminal itself to the master terminal 10-1 and the slave terminals 10-3, 10-4 within the communication range thereof on the basis of the receive signal strength intensity of signals received from the master terminal and slave terminals. The distance information indicating these calculated distances is passed to the positional relationship information processing unit 14.

In FIG. 8(*b*), the slave terminal 10-3 uses the distance calculation unit 131 of the positional relationship measuring unit 13 to respectively calculate (estimate) the distances L21, L22, L23 from the slave terminal itself to the master terminal 10-1 and slave terminals 10-2, 10-4 within the communication range thereof on the basis of the receive signal strength intensity of signals received from the master terminal and slave terminals. The distance information indicating these calculated distances is passed to the positional relationship information processing unit 14.

When this distance information is received in the positional relationship information processing unit 14 of the slave terminal 10-2 and the slave terminal 10-3, positional relationship information including this distance information is generated and transmitted to the master terminal 10-1 through the short range radio communication unit 11.

FIG. 9 is a view showing the configuration of positional relationship information 140 generated by the positional relationship information processing unit 14 and transmitted to the master terminal 10-1.

This positional relationship information 140 is constituted by an ID for the transmission source slave, information regarding the number of terminals included within the communication range of this slave, and information regarding the distances between the slave terminal and each terminal. Here, the distance information is an aggregate of the distances between the slave terminal and each of the terminals included within the communication range thereof, for example.

In this example, the distance information within the positional relationship information 140 transmitted from the slave terminal 10-2 is (L1=L11+L12+L13), and the distance information within the positional relationship information 140 transmitted from the slave terminal 10-3 is (L2=L21+L22+L23). It is assumed here that L1>L2.

The master terminal 10-1 receives the positional relationship information 140 transmitted from each of the network-forming terminals 10-2, 10-3, 10-4 via the short range radio communication unit 11 and downloads the information into the positional relationship information processing unit 14.

The positional relationship information processing unit 14 determines the terminal subject to switching on the basis of each set of received positional relationship information 140. More specifically, the "number of terminals included within the communication range" in each set of received positional relationship information 140 is compared, and the slave terminal with the largest number of terminals in the communication range thereof is determined as the slave terminal subject to switching.

If there is more than one slave terminal which includes the largest number of terminals in the communication range thereof, the "information regarding the distances between each terminal" in each set of positional relationship information 140 received from the slave terminals is then compared and the slave terminal with the shortest distances between each terminal is determined as the slave terminal subject to switching.

In the case of the positional relationship in FIG. 5(b), the slave terminal 10-2 and the slave terminal 10-3 are retrieved as the terminals with the largest number of terminals in the communication range (see FIG. 8), and on the basis of the result of a comparison between the information L1, L2 regarding the distances between each of the terminals calculated according to the method described in FIG. 8, (this result indicating L1>L2), it is judged that the distances between the slave terminal 10-3 and each terminal are smaller than those of the slave terminal 10-2. Thus the slave terminal 10-3 is determined as the slave terminal subject to switching (see FIG. 5(c)).

The reason that the slave terminal 10-3, having the shortest distances between itself and each of the terminals in its communication range, is determined as the switching subject is that when this slave terminal 10-3 becomes the new master terminal and forms a network with the terminals in its communication range, the short distances between the slave terminal 10-3 and each terminal ensure high quality communication.

In other words, according to a method of determining the slave terminal subject to switching in which "information regarding the distances between a slave terminal and each of the terminals within the communication range thereof" is included in the positional relationship information 140 transmitted to the master terminal from each of the slave terminals forming the network and this distance information is also used in the determining method, a higher quality of communication can be ensured in the network which is formed after switching to a communication mode with this slave terminal as the new master terminal.

Thus in the third and fourth embodiments, the terminal which is to become the next master terminal is determined on the basis of positional relationship information (the number of terminals included within the communication range of each slave terminal and information regarding the distances between each slave terminal and each terminal with the communication range thereof) which is received by the master terminal from each slave, and hence the occurrence of a terminal deviating from the communication range of the new master terminal in the network formed with this terminal as the new master terminal can be forestalled and short range radio communication among the same terminals as those prior to switching can be maintained.

In particular, if the terminal to be the next master terminal is determined by gathering information regarding the distances between each slave terminal and the terminals within the communication range thereof as positional relationship information and using this distance information in the determination process, a higher quality of communication can be ensured in the network formed after switching to a communication mode with this slave terminal as the new master terminal.

In the first through fourth embodiments, switching of the communication mode between master terminal and slave terminal is performed on the basis of battery information or positional relationship information. However, a configuration in which a more appropriate slave terminal is selected as the new master terminal may be provided if both battery information and positional relationship information are used.

Therefore, a radio communication method for selecting a slave terminal to become a new master terminal using battery information and positional relationship information and switching the master terminal with the selected slave terminal will be described as a fifth embodiment.

Figure 10:
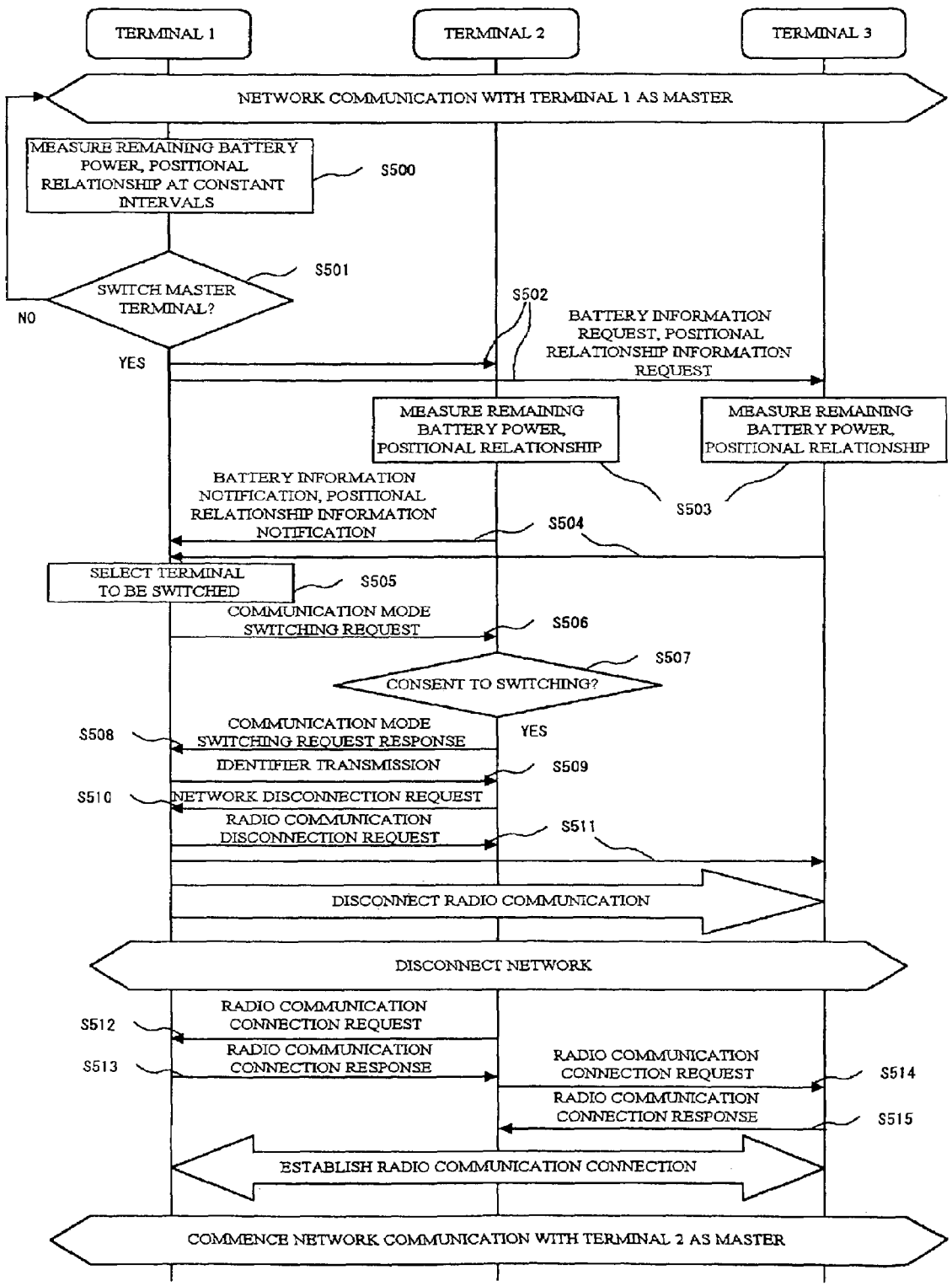
FIG. 10 is a flowchart illustrating the sequence of a communication mode switching method in a fifth embodiment.

FIG. 10 is a flowchart illustrating a communication mode switching sequence between master terminal and slave terminal based on the remaining battery power and positional relationship of each terminal in the communication mode switching method according to the fifth embodiment.

In FIG. 10 in this embodiment, a network is initially connected with terminal 1 as the master terminal and terminals 2 and 3 as slave terminals. Terminals 1, 2, 3 use radio communication devices 10 having the configuration illustrated in FIG. 2.

During communication in a network with terminal 1 as the master terminal, the master terminal measures its remaining battery power and positional relationship at constant intervals (step S500) and judges whether or not the master terminal is subject to switching (step S501).

Here, if all of the slave terminals are within the communication range of the master terminal, and if the remaining battery power thereof exceeds a constant value or the decrease value of the remaining battery power is less than a constant value, it is judged that it is not time to switch communication mode (NO in step S501) and the network with terminal 1 as master terminal and terminals 2 and 3 as slave terminals is maintained.

If the position of any of the slave terminals is outside of the communication range of the master terminal, or if the remaining battery power is equal to or below a constant value or the decrease value of the remaining battery power is equal to or greater than a constant value, it is judged to be time for switching communication mode (YES in step S501) and the master terminal requests battery information and positional relationship information from the slave terminals (step S502).

The slave terminals measure their remaining battery power and positional relationship (step S503) and notify the master terminal of the battery information and positional relationship information (step S504). From the notified battery information and positional relationship information, the master terminal selects the terminal with the greatest remaining battery power from among the terminals which include the largest number of network-forming terminals within the communication ranges thereof as the subject of communication mode switching (step S505).

In this embodiment, terminal 2 has the greatest remaining battery power from among the terminals with the largest number of network-forming terminals within the communication ranges thereof, and therefore terminal 2 is selected as the subject of communication mode switching.

A communication mode switching request is then transmitted to terminal 2, which is the slave terminal subject to switching (step S506), whereupon a judgment is made in terminal 2 as to whether consent to switching shall be given (step S507).

If consent to switching is given (YES in step S507), a response to the communication mode switching request is transmitted (step S508) and the master terminal transmits the identifiers of the terminals forming the network to the slave terminal subject to switching (step S509).

Then, when a network disconnection request is received from the slave terminal subject to switching (step S510), a network disconnection request is transmitted to each slave terminal (step S511) and the network is disconnected.

Upon disconnection of the network, terminal 2, which is the slave terminal subject to switching, transmits a connection request to any one of the terminals forming the network (step S512), and having received a response regarding radio communication connection from that terminal (step S513), transmits a connection request to another one of the terminals forming the network (step 5514). When a response regarding radio communication connection is received from this terminal (step S515), the network is reconnected with the terminal itself (terminal 2) as master terminal.

With this reconnection, the communication mode of terminal 1 is switched from a communication mode as master terminal to a communication mode as slave terminal, and the communication mode of terminal 2 is switched from a communication mode as slave terminal to a communication mode as master terminal. Thus network communication with terminal 2 as master terminal commences.

Thus in the fifth embodiment the terminal with the greatest remaining battery power from among the slave terminals with the largest number of network-forming terminals within the communication ranges thereof becomes the new master terminal, and hence network disconnection upon master terminal switching can be prevented and a network which is constituted by the same terminals can be maintained over a long period of time.

Further, by selecting a terminal with sufficient remaining battery power from among the slave terminals with the largest number of terminals within the communication ranges thereof as the new master terminal, the number of network reconnections due to decreases in the remaining battery power of the master terminal can be suppressed, and hence network reconnection processing and battery power consumption can be suppressed.

Also, since switching is performed after obtaining consent from the terminal subject to switching, switching may be refused when the slave terminal subject to switching is not suitable to operate as master terminal, and thus a network may be formed with an appropriate terminal as master terminal.

In the fifth embodiment, switching is performed after consent is obtained from the terminal subject to switching, but switching may be performed without obtaining consent, and this method will be described below using a sixth embodiment.

Figure 11:
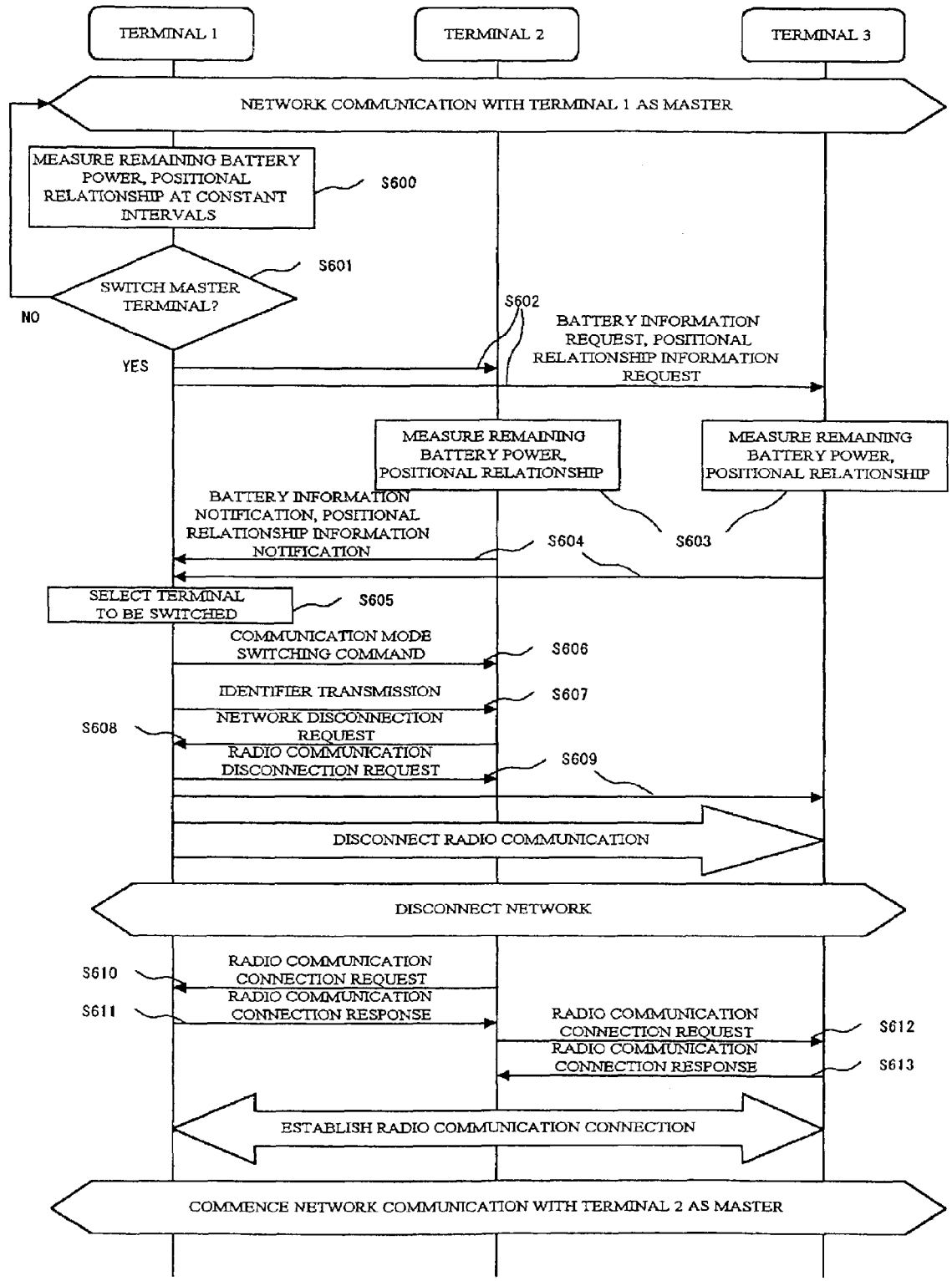
FIG. 11 is a flowchart illustrating the sequence of a communication mode switching method in a sixth embodiment.

FIG. 11 is a flowchart illustrating a communication mode switching procedure between master terminal and slave terminal based on the remaining battery power and positional relationship of each terminal in the communication mode switching method according to the sixth embodiment.

In FIG. 11 in this embodiment, a network is initially connected with terminal 1 as the master terminal and terminals 2 and 3 as slave terminals. Terminals 1, 2, 3 use radio communication devices 10 having the configuration illustrated in FIG. 2.

During communication in a network with terminal 1 as the master terminal, the master terminal measures its remaining battery power and positional relationship at constant intervals (step S600) and judges whether or not the master terminal is subject to switching (step S601).

Here, if all of the slave terminals are within the communication range of the master terminal, and if the remaining battery power exceeds a constant value or the decrease value of the remaining battery power is less than a constant value, it is judged that it is not time to switch communication mode (NO in step S601) and the network with terminal 1 as master terminal and terminals 2 and 3 as slave terminals is maintained.

If the position of any of the slave terminals is outside of the communication range of the master terminal, or if the remaining battery power is equal to or below a constant value or the decrease value of the remaining battery power is equal to or greater than a constant value, it is judged to be time for switching communication mode (YES in step S601) and the master terminal requests battery information and positional relationship information from the slave terminals (step S602).

The slave terminals measure their remaining battery power and positional relationship (step S603) and notify the master terminal of the battery information and positional relationship information (step S604). From the notified battery information and positional relationship information, the master terminal selects the terminal with the greatest remaining battery power from among the terminals which include the largest number of network-forming terminals within the communication ranges thereof as the subject of communication mode switching (step S605).

In this embodiment, terminal 2 has the greatest remaining battery power from among the terminals with the largest number of network-forming terminals within the communication ranges thereof, and therefore terminal 2 is selected as the subject of communication mode switching.

A communication mode switch command is then transmitted to terminal 2, which is the slave terminal subject to switching (step S606), and identifiers for the terminals forming the network are also transmitted thereto (step S607).

When a network disconnection request is received from the slave terminal subject to switching (step S608), a network disconnection request is transmitted to each slave terminal (step S609) and the network is disconnected.

Upon disconnection of the network, terminal 2, which is the slave terminal subject to switching, transmits a connection request to any one of the terminals forming the network (step S610), and having received a response regarding radio communication connection from that terminal (step S611), transmits a connection request to another one of the terminals forming the network (step S612). When a response regarding radio communication connection is received from this terminal (step S613), the network is reconnected with the terminal itself (terminal 2) as master terminal.

With this reconnection, the communication mode of terminal 1 is switched from master terminal to slave terminal and the communication mode of terminal 2 is switched from slave terminal to master terminal. Thus network communication with terminal 2 as master terminal commences.

Thus in the sixth embodiment the terminal with the greatest remaining battery power from among the slave terminals with the largest number of network-forming terminals within the communication ranges thereof becomes the new master terminal, and hence network disconnection upon master terminal switching can be prevented and a network which is constituted by the same terminals can be maintained over a long period of time.

Further, since the terminal with the greatest remaining battery power from among the slave terminals with the largest number of network-forming terminals within the communication ranges thereof becomes the new master terminal, the number of network reconnections due to decreases in remaining battery power can be suppressed, and hence network reconnection processing and battery power consumption can be suppressed.

Further, since consent from the terminal subject to switching is not necessary, a network can be formed with an appropriate terminal as master terminal without placing a load upon the user of the subject terminal.

Note that information regarding the distances between each slave terminal and each of the terminals within the communication range thereof may also be used in the fifth and sixth embodiments as positional relationship information received by the master terminal from each slave terminal as well as information regarding the number of terminals included within the communication range of each slave.

The positional relationship information 140 including distance information (see FIG. 9) may be gathered according to the method which was described with reference to FIG. 8, and the master terminal may determine the slave terminal subject to switching on the basis of this positional relationship information 140 and battery information gathered from each of the slave terminals.

In this case, the master terminal may determine the slave terminal subject to switching by selecting a mode in which either distance is given priority or battery power is given priority.

If distance is given priority, in the positional relationship state illustrated in FIG. 8, for example, a judgment is made on the basis of the "information regarding the distances between each terminal" in the positional relationship information 140 transmitted from the slave terminals 10-2, 10-3 that the slave terminal 10-3, from among the slave terminals 10-2, 10-3 which have the largest number of terminals within their communication ranges, has shorter distances between itself and the terminals in its communication range than the slave terminal 10-2 (L1>L2), and therefore this slave terminal 10-3 may be determined as the slave terminal subject to switching.

If battery power is given priority, however, when the slave terminal 10-2 has greater remaining battery power, then the slave terminal 10-2 may be determined as the slave terminal subject to switching even if the slave terminal 10-3 has shorter distances between itself and the terminals in its communication range than the slave terminal 10-2 (L1>L2).

When distance is given priority and the slave terminal determined at that time as the switching subject subsequently becomes master terminal to form a network with the terminals in the communication range thereof, a higher level of communication quality can be maintained. When battery power is given priority and the slave terminal determined at that time as the switching subject subsequently becomes master terminal, the network formed with the terminals in the communication range thereof can be maintained for a longer period of time.

Next, a radio communication method for switching a master terminal and slave terminal in which communication with each terminal may be performed when a slave terminal falls outside of the communication range of the master terminal to become forcibly disconnected from the network will be described.

Figure 12:
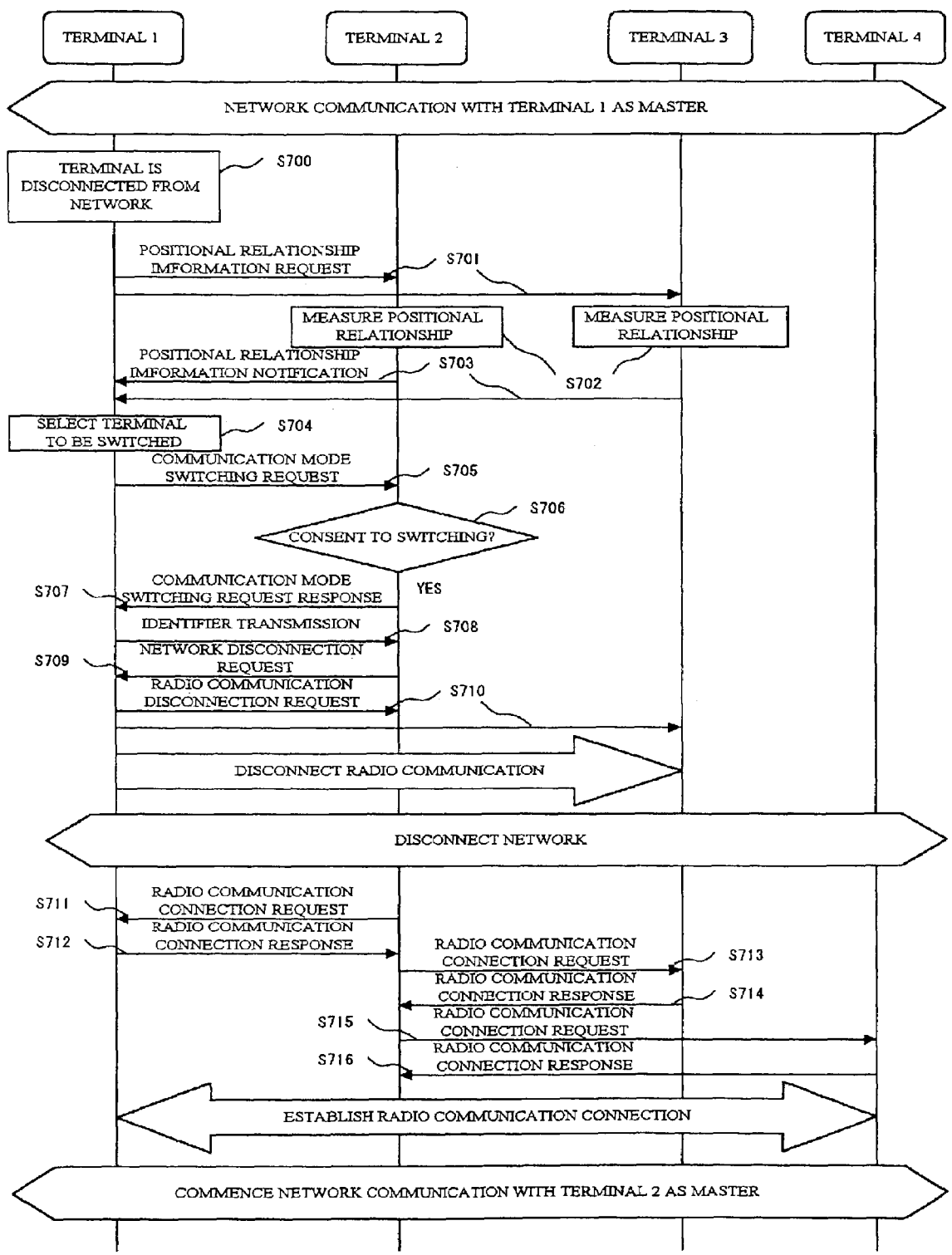
FIG. 12 is a flowchart illustrating the sequence of a communication mode switching method in a seventh embodiment.

FIG. 12 is a flowchart illustrating a communication mode switching sequence between master terminal and slave terminal based on the positional relationship of each terminal in the communication mode switching method according to a seventh embodiment.

In FIG. 12 in this embodiment, a network is initially connected with terminal 1 as the master terminal and terminals 2 through 4 as slave terminals. Terminals 1, 2, 3, and 4 use radio communication devices 10 having the configuration illustrated in FIG. 2.

When a slave terminal is forcibly disconnected from the network (step S700) during communication in a network with terminal 1 as the master terminal, it is judged to be time to switch the master terminal and the master terminal requests positional relationship information from the network-connected slave terminals (step S701).

In this embodiment, terminal 4 is assumed to have been forcibly disconnected from the network.

The slave terminals from which positional relationship information has been requested measure their positional relationship (step S702) and notify the master terminal of the positional relationship information (step S703). From the notified positional relationship information, the master terminal selects the terminal which includes the largest number of network-forming terminals (including the terminal which has been forcibly disconnected from the network) within the communication range thereof as the subject of communication mode switching (step S704).

In this embodiment, it is assumed that the largest number of network-forming terminals is included within the communication range of terminal 2, and therefore terminal 2 is selected as the subject of communication mode switching.

A communication mode switching request is then transmitted to terminal 2, which is the slave terminal subject to switching (step S705), whereupon a judgment is made in terminal 2 as to whether consent to switching shall be given (step S706).

If consent to switching is given (YES in step S706), a response to the communication mode switching request is transmitted (step S707) and the master terminal transmits the identifiers of the terminals forming a network which includes the forcibly disconnected terminal to the slave terminal subject to switching (step S708).

Then, when a network disconnection request is received from the slave terminal subject to switching (step S709), a network disconnection request is transmitted to each slave terminal (step S710) and the network is disconnected.

Upon disconnection of the network, terminal 2, which is the slave terminal subject to switching, transmits a connection request to any one of the terminals forming the network (step S711), and having received a response regarding radio communication connection from that terminal (step S712), transmits a connection request to another one of the terminals forming the network (step S713) and receives a response regarding radio communication connection from this terminal (step S714).

A connection request is then transmitted to the terminal which was forcibly disconnected from the network (step S715), and when a response regarding radio communication connection is received from this terminal (step S716), the terminal (terminal 2) becomes master terminal and a network including the terminal (terminal 4) which was forcibly disconnected from the network is reconnected.

With this reconnection, the communication mode of terminal 1 is switched from a communication mode as master terminal to a communication mode as slave terminal, and the communication mode of terminal 2 is switched from a communication mode as slave terminal to a communication mode as master terminal. Thus network communication with terminal 2 as master terminal commences.

Thus in the seventh embodiment, when a terminal is forcibly disconnected from the network, the slave terminal which includes the largest number of terminals in its communication range is selected from among the terminals forming a network which includes the forcibly disconnected terminal as the new master terminal, and hence network disconnection due to a terminal moving can be prevented and a network which is constituted by the same terminals can be maintained over a long period of time.

Further, since switching is performed after obtaining consent from the terminal subject to switching, switching may be refused when the slave terminal subject to switching is not suitable to operate as master terminal, and thus a network may be formed with an appropriate terminal as master terminal.

In the seventh embodiment, switching is performed after consent is obtained from the terminal subject to switching, but switching may be performed without obtaining consent, and this method will be described below using an eighth embodiment.

Figure 13:
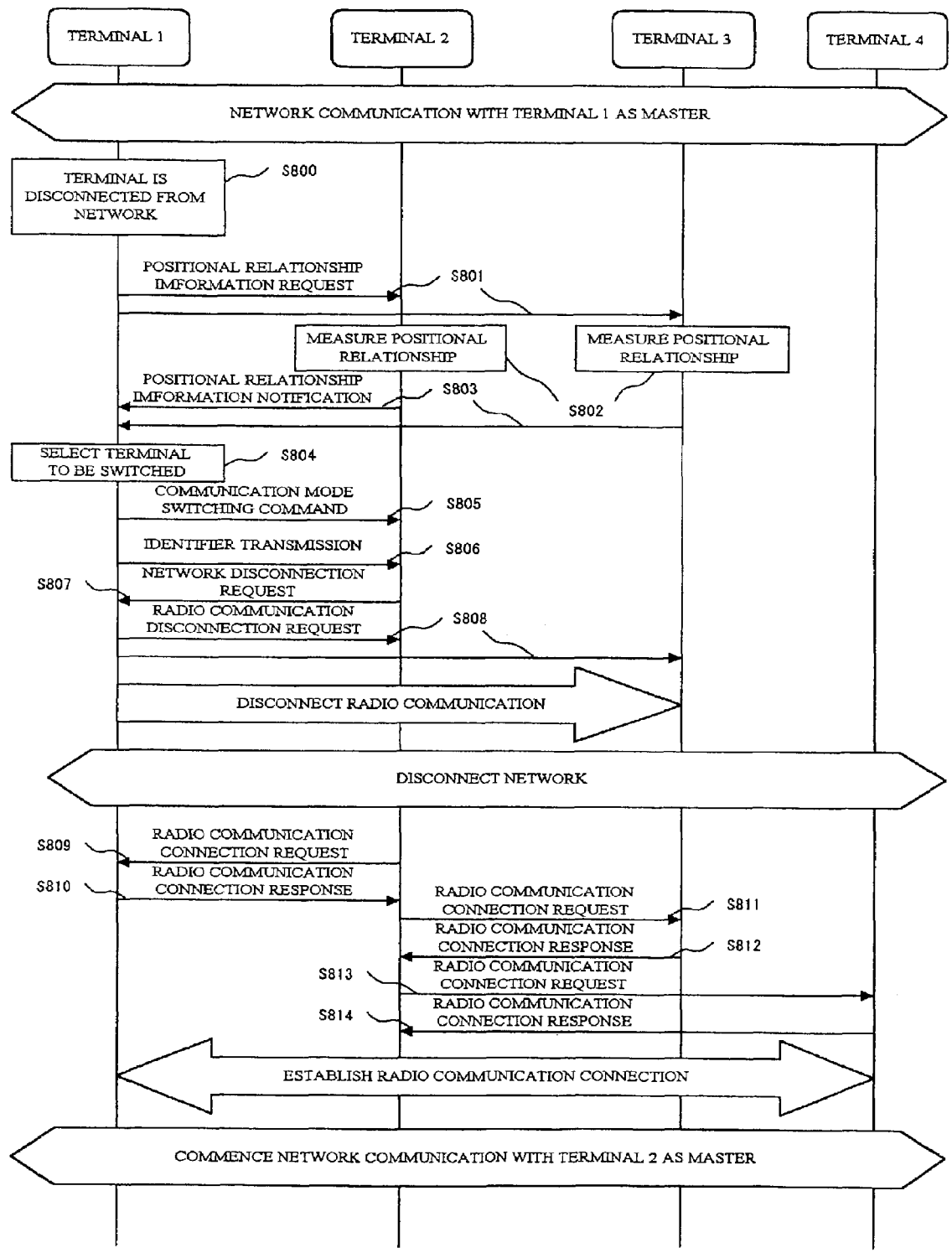
FIG. 13 is a flowchart illustrating the sequence of a communication mode switching method in an eighth embodiment.

FIG. 13 is a flowchart illustrating a communication mode switching sequence between master terminal and slave terminal based on the positional relationship of each terminal in the communication mode switching method according to an eighth embodiment.

In FIG. 13 in this embodiment, a network is initially connected with terminal 1 as the master terminal and terminals 2 through 4 as slave terminals. Terminals 1, 2, 3, and 4 use radio communication devices 10 having the configuration illustrated in FIG. 2.

When a slave terminal is forcibly disconnected from the network (step S800) during communication in a network with terminal 1 as the master terminal, it is judged to be time to switch the master terminal and the master terminal requests positional relationship information from the network-connected slave terminals (step S801).

In this embodiment, terminal 4 is assumed to have been forcibly disconnected from the network.

The slave terminals from which positional relationship information has been requested measure their positional relationship (step S802) and notify the master terminal of the positional relationship information (step S803). From the notified positional relationship information, the master terminal selects the terminal which includes the largest number of network-forming terminals (including the terminal which has been forcibly disconnected from the network) within the communication range thereof as the subject of communication mode switching (step S804).

In this embodiment, it is assumed that the largest number of network-forming terminals is included within the communication range of terminal 2, and therefore terminal 2 is selected as the subject of communication mode switching.

A communication mode switch command (step S805) and identifiers for the terminals which form a network including the forcibly disconnected terminal (step S806) are then transmitted to terminal 2, which is the slave terminal subject to switching.

Then, when a network disconnection request is received from the slave terminal subject to switching (step S807), a network disconnection request is transmitted to each slave terminal (step S808) and the network is disconnected.

Upon disconnection of the network, terminal 2, which is the slave terminal subject to switching, transmits a connection request to any one of the terminals forming the network (step S809), and having received a response regarding radio communication connection from that terminal (step S810), transmits a connection request to another one of the terminals forming the network (step S811) and receives a response regarding radio communication connection from this terminal (step S812).

A connection request is then transmitted to the terminal which was forcibly disconnected from the network (step S813), and when a response regarding radio communication connection is received from this terminal (step S814), the terminal (terminal 2) becomes master terminal and a network including the terminal (terminal 4) which was forcibly disconnected from the network is reconnected.

With this reconnection, the communication mode of terminal 1 is switched from master terminal to slave terminal and the communication mode of terminal 2 is switched from slave terminal to master terminal. Thus network communication with terminal 2 as master terminal commences.

Thus in the eighth embodiment, when a terminal is forcibly disconnected from the network, the slave terminal which includes the largest number of terminals in its communication range is selected from among the terminals forming a network which includes the forcibly disconnected terminal as the new master terminal, and hence network disconnection due to a terminal moving can be prevented and a network which is constituted by the same terminals can be maintained over a long period of time.

Further, since consent from the terminal subject to switching is not necessary, a network can be formed with an appropriate terminal as master terminal without placing a load upon the user of the subject terminal.

However, in all of the aforementioned first through eighth embodiments, communication mode switching such that communication mode switching timing is determined by the master terminal, a communication mode switching request is issued at this timing to the slave terminal subject to switching, and the network is reconstructed in accordance with this request with the slave terminal subject to switching as master terminal, is mainly performed by the master terminal.

In this method, if the master terminal becomes disconnected from the network, the function for issuing the aforementioned communication mode switching request disappears and thus it may be impossible to reconstruct the network.

The ninth embodiment has been devised in consideration of these circumstances, and according thereto, an arbitrary terminal is designated in advance by the master terminal as a substitute master terminal so that a network can be surely reconstructed even when the master terminal becomes disconnected from the network. This designated terminal (substitute terminal) reconstructs the network by detecting the disconnection of the master terminal from the network.

Figure 14:
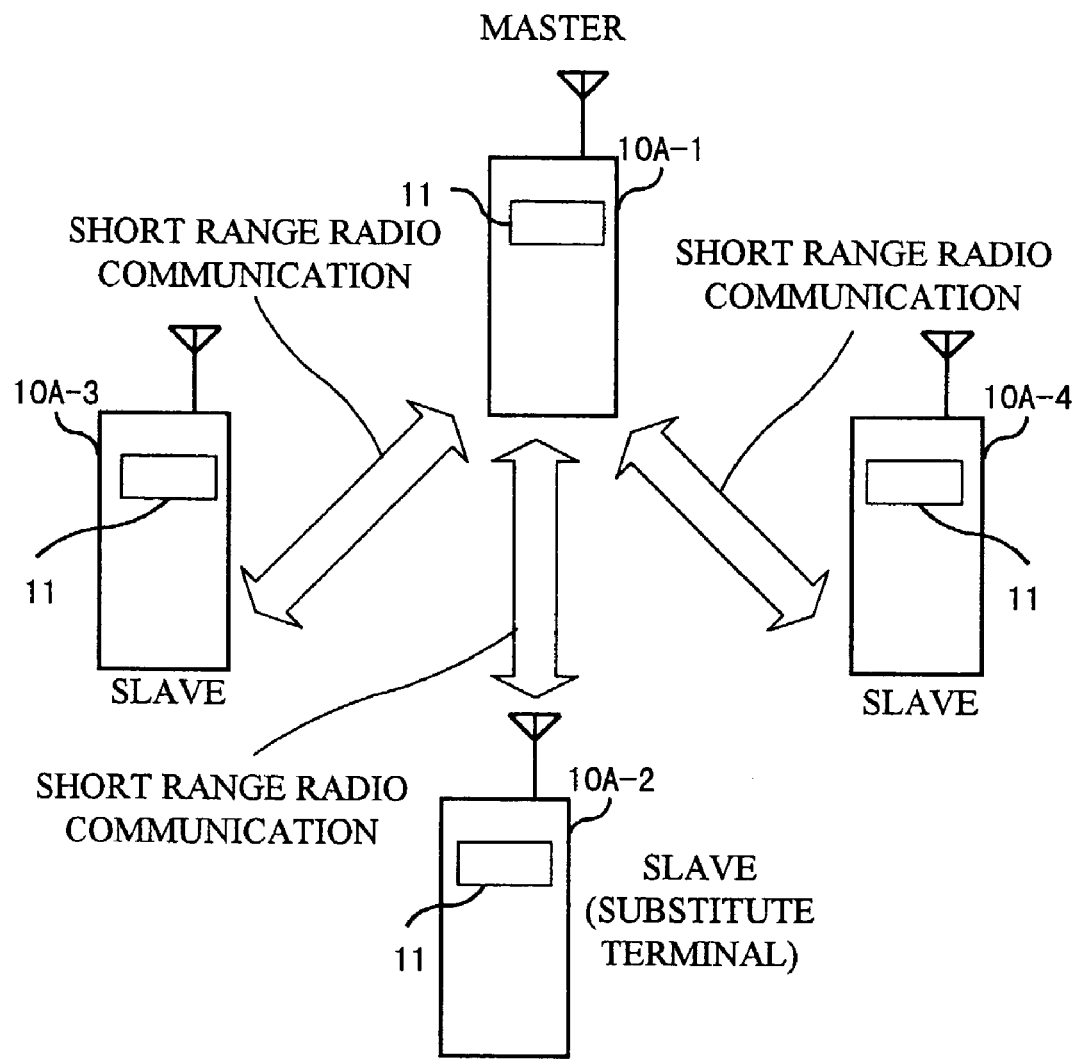
FIG. 14 is a view illustrating the configuration of a radio communication system according to a ninth embodiment and a communication image thereof.

FIG. 14 is a view illustrating the configuration of a communication system according to the ninth embodiment and a communication image thereof.

As is illustrated in FIG. 14, the radio communication devices 10A-1, 10A-2, 10A-3, and 10A-4 used in the radio communication system of this embodiment are each provided with a short range radio communication unit 11.

Thus the radio communication devices 10A-1, 10A-2, 10A-3, 10A-4 are able to perform short range radio communication with another terminal by means of short range radio communication control of the short range radio communication units 11.

The example in FIG. 14 shows an image of real time bidirectional communication performed by short range radio communication control of the short range radio communication units 11, this communication being performed such that the radio communication device 10A-1 is set to operate as master terminal and the another radio communication devices 10A-2, 10A-3, 10A-4 are set to operate as slave terminals, whereby the master terminal 10A-1 and peripheral slave terminals 10A-2, 10A-3, 10A-4 are connected in a star formation.

It is assumed that the real time bidirectional communication in this network configuration is online chat in which messages are exchanged between the master terminal 10A-1 and the slave terminals 10A-2, 10A-3, 10A-4 without passing through a server.

The short range radio communication units 11 of the master terminal 10A-1 and slave terminals 10A-2, 10A-3, 10A-4 are each realized by Bluetooth, for example.

Bluetooth is operated under communication specifications of a 2.4 GHz band radio frequency and a 100 mW maximum radio output power. Transmission range is short (standard 10 m) and transmission output is small, and thus when a user exchanges messages on the move while carrying a radio communication device, for example, short range radio communication is likely to break down so that messages cannot be exchanged.

Thus if the user carrying the master terminal 10A-1 in the network configuration in FIG. 14 moves, for example, the master terminal 10A-1 may become disconnected from the network.

In the network configuration shown in FIG. 14, the disconnection of the master terminal 10A-1 from the network will also occurs in such abrupt communication disable situations that take place when the user of the master terminal 10A-1 forcibly stops the operation of the master terminal 10A-1 or turns off the power off.

According to this embodiment, when such a situation arises, a network may be reconstructed among the slave terminals 10A-2, 10A-3, 10A-4 apart from the network-disconnected master terminal 10A-1 in a new master terminal-slave terminal star connection formation so that real time bidirectional communication can be continued.

Figure 15:
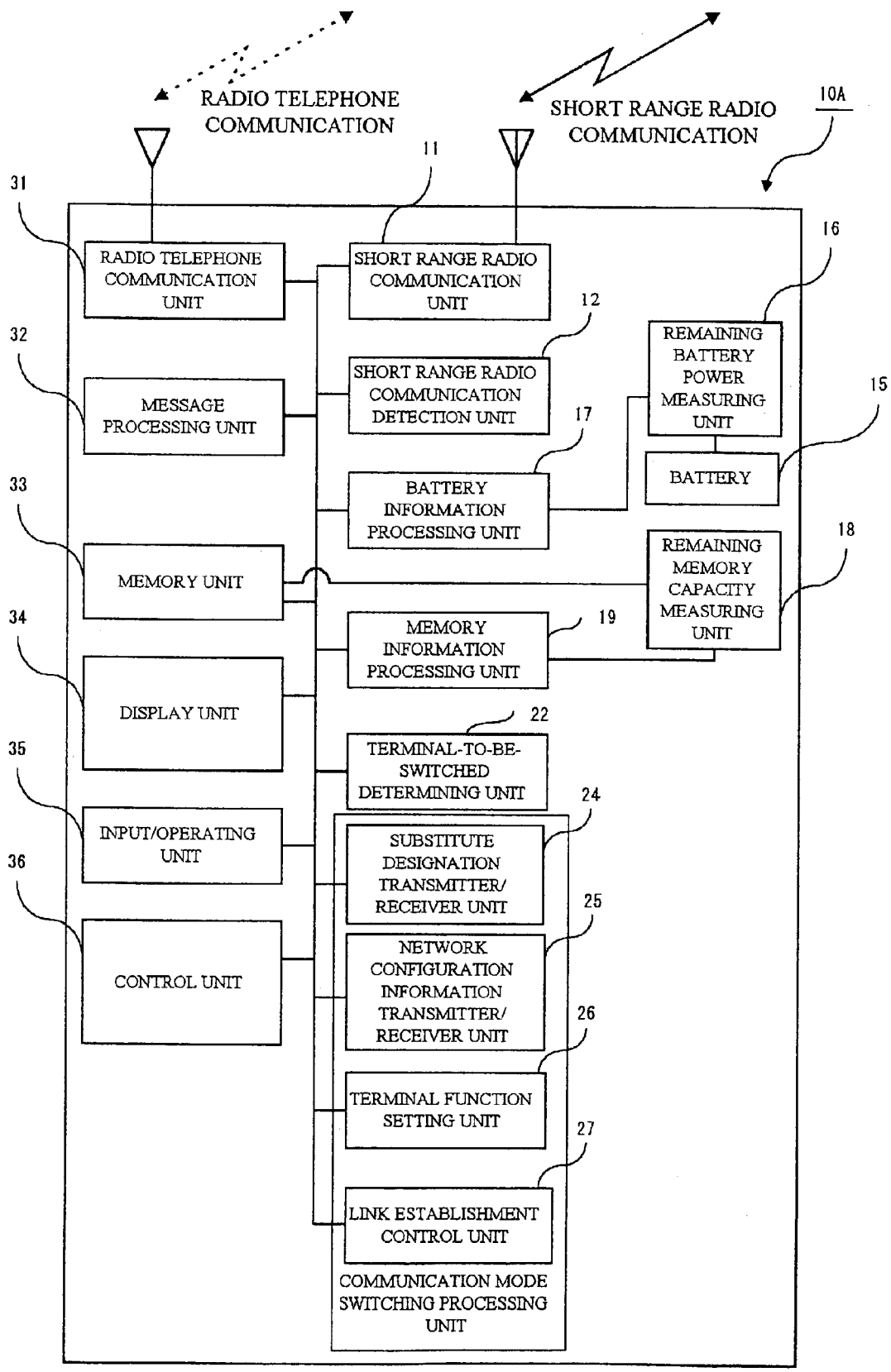
FIG. 15 is a block diagram illustrating the configuration of a radio communication device according to the ninth embodiment.

FIG. 15 is a block diagram illustrating the configuration of a radio communication device 10A (used as the master terminal 10A-1 and the slave terminals 10A-2, 10A-3, 10A-4) according to the present invention.

As is illustrated in FIG. 15, the radio communication device 10A according to this embodiment comprises a short range radio communication unit 11, a short range radio communication detection unit 12, a battery 15, a remaining battery power measuring unit 16, a battery information processing unit 17, a remaining memory capacity measuring unit 18, a memory information processing unit 19, a switching subject terminal determining unit 22, a substitute designation transmitter/receiver unit 24, a network configuration information transmitter/receiver unit 25, a terminal function setting unit 26, a link establishment control unit 27, a radio telephone communication unit 31, a message processing unit 32, a memory unit 33, a display unit 34, an input/operating unit 35, and a control unit 36.

Here, the short range radio communication unit 11, battery 15, remaining battery power measuring unit 16, battery information processing unit 17, switching subject terminal determining unit 22, radio telephone communication unit 31, message processing unit 32, memory unit 33, display unit 34, input/operating unit 35, and control unit 36 perform the same functions as the corresponding portions in the radio communication device 10 shown in FIG. 2.

The terminal function setting unit 26 sets whether the terminal in which it is comprised is to operate as master terminal or a slave terminal in the network configuration as illustrated in FIG. 14. Note that master terminal or slave terminal setting may be performed by inputting predetermined setting information through the input/operating unit 35, for example.

If the terminal function setting unit 26 is set to operate as slave terminal and this slave terminal is designated as the substitute master terminal by the master terminal, and if the disconnection of the master terminal from the network is subsequently detected, the terminal function setting unit 26 also functions to switch the setting of the terminal from slave terminal to master terminal.

The link establishment control unit 27 performs control of the establishment of links with opposing terminals depending upon whether the terminal comprising the link establishment control unit 27 is set to operate as master terminal or slave. When set as master terminal, for example, links are established with each of the peripheral terminals which are set as slave terminals, and when set as slave terminal, a link is established with the master terminal.

Also when set as slave terminal, if the terminal which comprises the link establishment control unit 27 is designated as the substitute terminal by the master terminal and receives network configuration information from the master terminal relating to the current network, and is subsequently switched from slave terminal setting to master terminal setting when the disconnection of the master terminal from the network is detected, links are established with each of the peripheral terminals on the basis of the network configuration information and the network is reconstructed with this terminal as master terminal.

The substitute designation transmitter/receiver unit 24 selects an arbitrary peripheral terminal to be a substitute terminal candidate when the terminal comprising this unit 24 is set to operate as master terminal and transmits to the selected terminal substitute designation information designating this terminal as the substitute master terminal.

When the terminal comprising the substitute designation transmitter/receiver unit 24 is set to operate as slave terminal, this unit 24 receives the substitute designating information transmitted from the master terminal designating this slave terminal as the substitute master terminal.

When the terminal comprising the network configuration information transmitter/receiver unit 25 is set to operate as master terminal, this unit 25 transmits network configuration information comprising identification information and connection information (master terminal/slave terminal relationship) for each of the terminals constituting the current network to the terminal designated as the substitute terminal.

When the terminal comprising the network configuration information transmitter/receiver unit 25 is set to operate as slave terminal and has been designated by the master terminal as the substitute terminal, this unit 25 receives the network configuration information transmitted from the master terminal and stores same in a predetermined storage area in the memory unit 33, for example.

The substitute designation transmitter/receiver unit 24, network configuration information transmitter/receiver unit 25, terminal function setting unit 26, and link establishment control unit 27 constitute a communication mode switching processing unit.

The short range radio communication detection unit 12 is a part for checking the Bluetooth connection condition between opposing terminals via the short range radio communication unit 11. When the terminal comprising the short range radio communication detection unit 12 operates as master terminal in accordance with the setting of the terminal function setting unit 26, for example, this unit 12 detects whether the terminal designated as substitute terminal is disconnected, and when the terminal comprising the terminal function setting unit 26 operates as slave terminal in accordance with the setting of the terminal function setting unit 26 and has been designated as substitute terminal by the master terminal, this unit 12 detects whether or not the master terminal is disconnected from the network.

The remaining memory capacity measuring unit 18 measures the remaining amount of memory in the memory unit 33.

When the terminal comprising the memory information processing unit 19 is set to operate as master terminal, this unit 19 uses the remaining memory capacity measuring unit 18 to measure the remaining amount of memory in the memory unit 33 of the master terminal at constant intervals and also requests remaining memory capacity notification from the slave terminals and receives the responses thereto.

When the terminal comprising the memory information processing unit 19 is set to operate as slave terminal, on the other hand, this unit 19 uses the remaining memory capacity measuring unit 18 to measure the remaining amount of memory in the memory unit 33 of this slave terminal after receiving a request for remaining memory capacity notification from the master terminal, and transmits this information to the master terminal.

Next, the communication operations of the radio communication device 10A according to this embodiment will be described using a specific example.

It is assumed in this description that the radio communication devices 10A-1, 10A-2, 10A-3, and 10A-4 in the network configuration shown in FIG. 14 are each constituted as shown in FIG. 15 and that these radio communication devices 10A-1, 10A-2, 10A-3, and 10A-4 are performing short range radio communication.

It is assumed at this time that the radio communication device 10A-1 is operating as master terminal in accordance with the setting of the terminal function setting unit 26 thereof, and that the another radio communication devices 10A-2, 10A-3, 10A-4 are operating as slave terminals in accordance with the setting of the respective terminal function setting units 26 thereof.

For ease in the following description, the radio communication device 10A-1 will be referred to as the master terminal, and the radio communication devices 10A-2, 10A-3, 10A-4 will be referred to respectively as slave terminals.

Under these setting conditions, the master terminal 10A-1 uses the link establishment control unit 27 thereof to establish links with the slave terminals 10A-2, 10A-3, 10A-4 via the short range radio communication unit 11, while the slave terminals 10A-2, 10A-3, 10A-4 use the link establishment control units 27 thereof to establish links with the master terminal 10A-1 via the short range radio communication units 11, and thus message exchange with the master terminal 10A-1 is performed by means of short range radio communication.

When the master terminal 10A-1 and the slave terminals 10A-2, 10A-3, 10A-4 are thus connected in star formation by means of short range radio communication so as to exchange messages, the master terminal 10A-1 performs control to designate one of the slave terminals 10A-2, 10A-3, 10A-4 as the substitute terminal thereof (that is, the substitute master terminal) while the designated slave terminal from among the slave terminals 10A-2, 10A-3, 10A-4 receives this designation from the master terminal 10A-1 and performs control to become the substitute terminal of the master terminal 10A-1 and reconstruct the network.

Figure 16:
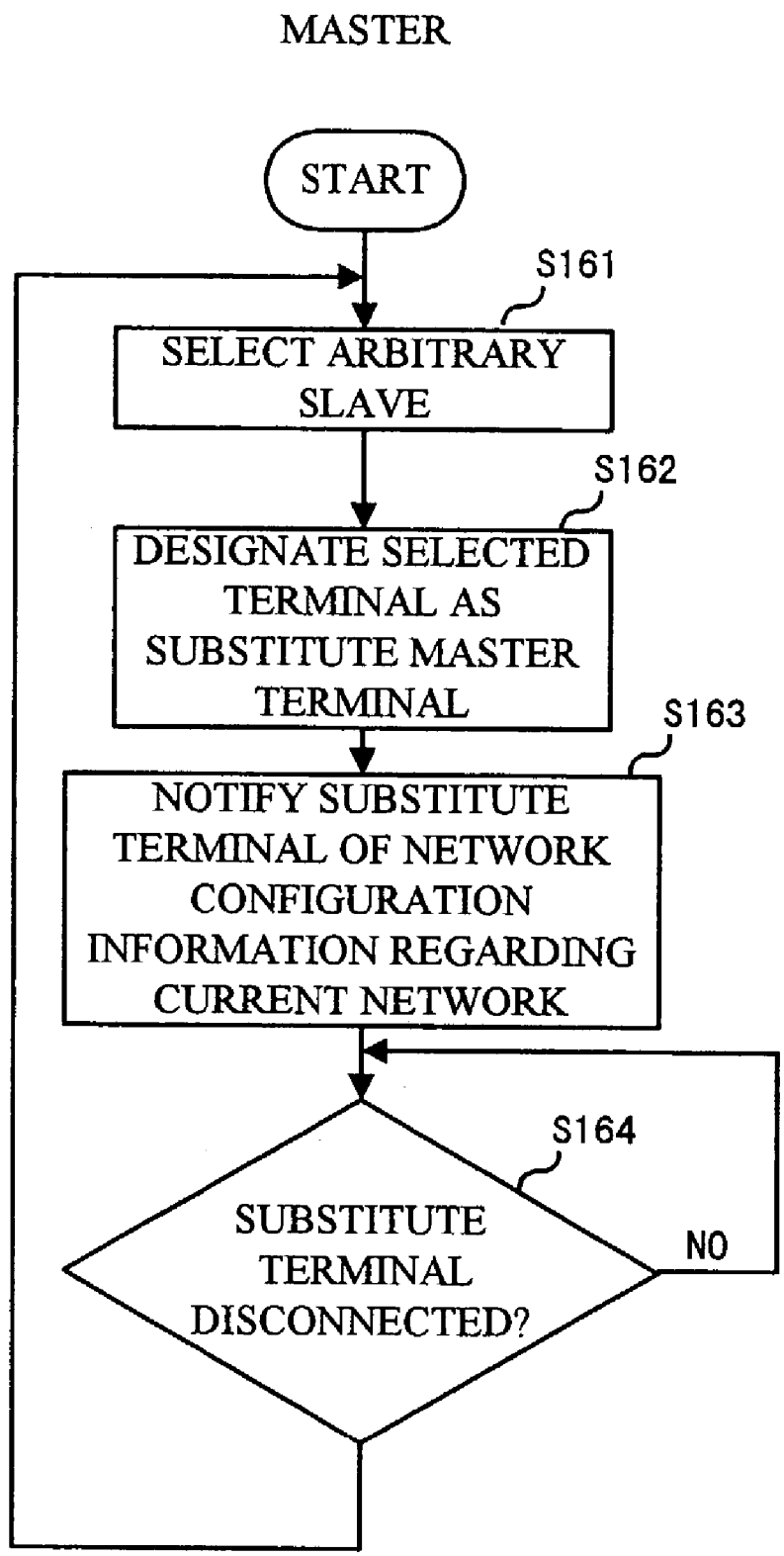
FIG. 16 is a flowchart illustrating a substitute terminal designation control operation performed when the radio communication device according to the ninth embodiment operates as master terminal.

FIG. 16 is a flowchart illustrating control operations for the designation of a substitute for the master terminal 10A-1 in FIG. 14.

The master terminal 10A-1 activates the substitute designation transmitter/receiver unit 24 at an arbitrary timing during message exchange (see FIG. 14) with the slave terminals 10A-2, 10A-3, 10A-4 in a message exchange session which is established with the slave terminals 10A-2, 10A-3, 10A-4 through the aforementioned link establishment control.

The substitute designation transmitter/receiver unit 24 selects an arbitrary terminal from among the slave terminals 10A-2, 10A-3, 10A-4 as a substitute candidate for the terminal in which the unit 24 is comprised (the master terminal) (step S161), and designates the selected substitute candidate terminal, for example the slave terminal 10A-2, as the substitute master terminal (step S162). Specifically, substitute designation information designating the substitute terminal for the master terminal 10A-1 is transmitted to the slave terminal 10A-2 via the short range radio communication unit 11.

Next, the network configuration information transmitter/receiver unit 25 of the master terminal 10A-1 reads the network configuration information (comprised of identification information and master terminal/slave terminal relationship information for the master terminal 10A-1 and the slave terminals 10A-3, 10A-4) regarding the configuration of the current network from a predetermined storage area in the memory unit 33 and transmits this information via the short range radio communication unit 11 to the slave terminal 10A-2 which became the substitute terminal upon reception of the aforementioned substitute designation information (step S163).

The master terminal 10A-1 then checks whether or not the short range radio communication detection unit 12 thereof has detected that the slave terminal 10A-2 (substitute terminal) has become disconnected (step S164).

If the disconnection of the slave terminal 10A-2 (substitute terminal) is not detected (NO in step S164), these checks continue, and when it is detected that the slave terminal 10A-2 (substitute terminal) has become disconnected (YES in step S164), processing returns to step S161 where a candidate for substitute master terminal is selected from the slave terminals 10A-3, 10A-4 other than the slave terminal 10A-2 (step S161) and the slave terminal 10A-3 or 10A-4 selected here is designated as substitute master terminal (step S162).

Thus the master terminal 10A-1 selects a substitute terminal candidate at an arbitrary timing, designates this terminal as substitute master terminal, and notifies this terminal of network configuration information regarding the current network. Then, if the substitute terminal (the substitute terminal candidate having received the aforementioned designation and network configuration information) becomes disconnected, the master terminal 10A-1 sets the terminal with the next most favorable conditions as a substitute terminal candidate and provides notification of the aforementioned designation and network configuration information. In this manner a substitute terminal is maintained at all times.

Note that as the method of substitute terminal candidate selection by the master terminal 10A-1, a method may be used in which remaining battery power is set to operate as the selection condition. For example, the master terminal 10A-1 measures its remaining battery power using the remaining battery power measuring unit 16 and then polls the respective remaining battery power amounts of each of the slave terminals 10A-2, 10A-3, 10A-4 such that when the remaining battery power of the master terminal 10A-1 falls below the remaining battery power of the slave terminals 10A-2, 10A-3, 10A-4, the terminal from among these slave terminals 10A-2, 10A-3, 10A-4 with the greatest remaining battery power is selected.

The polling of the remaining battery power in this case can be realized by similar processing to steps S102 to S104 in FIG. 3, for example.

That is, in this case the master terminal 10A-1 uses the battery information processing unit 17 to request notification of battery information indicating remaining battery power from each of the slave terminals 10A-2, 10A-3, 10A-4. When this request is received by the slave terminals 10A-2, 10A-3, 10A-4 through the battery information processing units 17 thereof, the remaining battery power of each of the terminals is measured by their remaining battery power measuring units 16 and these measured remaining battery power values are notified to the master terminal 10A-1 by the battery information processing units 17 such that the battery information processing unit 17 of the master terminal 10A-1 receives battery information notified from each slave terminal 10A-2, 10A-3, 10A-4.

A method may also be used in which remaining memory capacity is the selection condition. For example, the master terminal 10A-1 measures its remaining memory capacity using the remaining memory capacity measuring unit 18 and then polls the respective remaining memory capacities of the slave terminals 10A-2, 10A-3, 10A-4 such that when the remaining memory capacity of the master terminal 10A-1 falls below the remaining memory capacity of the slave terminals 10A-2, 10A-3, 10A-4, the terminal from among these slave terminals 10A-2, 10A-3, 10A-4 with the largest remaining memory capacity is selected.

In this case also, polling of the remaining memory capacity may be realized by similar processing to steps S102 to S104 in FIG. 3, for example.

That is, in this case the master terminal 10A-1 uses the memory information processing unit 19 to request notification of memory information indicating remaining memory capacity from each of the slave terminals 10A-2, 10A-3, 10A-4. When this request is received by the slave terminals 10A-2, 10A-3, 10A-4 through the memory information processing units 19 thereof, the remaining memory capacity of each of the terminals is measured by their remaining memory capacity measuring units 18 and these measured remaining memory capacities are notified to the master terminal 10A-1 by the memory information processing units 19 such that the memory information processing unit 19 of the master terminal 10A-1 receives memory information notified from each slave terminal 10A-2, 10A-3, 10A-4.

Figure 17:
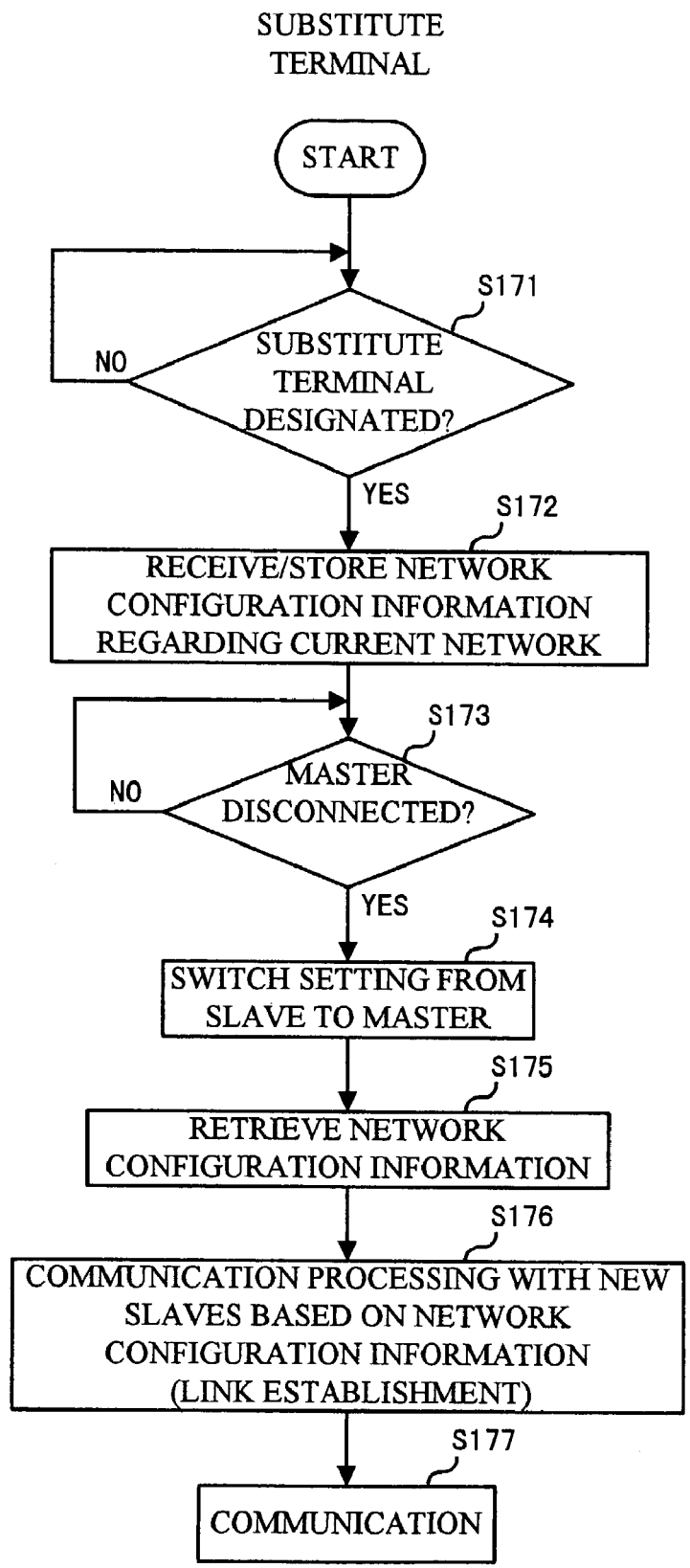
FIG. 17 is a flowchart illustrating a control operation for switching to a master terminal when the radio communication device according to the ninth embodiment operates as a slave.

FIG. 17 is a flowchart illustrating the control operations for the movement of the slave terminals 10A-2, 10A-3, 10A-4 in FIG. 14 to the master terminal.

As described above, during the exchange of messages between the slave terminals 10A-2, 10A-3, 10A-4 and the master terminal 10A-1 in a message exchange session established through the aforementioned link establishment control between each of the slave terminals 10A-2, 10A-3, 10A-4 and the master terminal 10A-1 (see FIG. 14), a check is performed by the master terminal 10A-1 as to whether a substitute master terminal has been designated, or in other words whether substitute designation information designating a substitute terminal for the master terminal 10A-1 and transmitted from the substitute designation transmitter/receiver unit 24 of the master terminal 10A-1 has been received by the substitute designation transmitter/receiver unit 24 of this substitute terminal (step S171).

If this substitute designation information has been received (YES in step S171), the slave terminal which received the substitute designation information (10A-2 in this example) receives into the network configuration information transmitter/receiver unit 25 thereof network configuration information transmitted from the master terminal 10A-1 following the substitute designation information, and stores this information in a predetermined storage area in the memory unit 33 (step S172).

Having received the substitute designation information and network configuration information, the slave terminal 10A-2 then learns the current network configuration on the basis of the network configuration information and, using the short range radio communication detection unit 12, checks whether or not the network disconnection of the master terminal 10A-1 from the current network has been detected (step S173).

Here, if the master terminal 10A-1 is disconnected from the network (YES in step S173), the slave terminal 10A-2 uses the terminal function setting unit 26 to switch settings from the current setting for operating as slave terminal to a setting for operating as master terminal (step S174).

Upon completion of this setting switching, the network information already received and stored in the link establishment control unit 27 of the radio communication device 10A-2 which has become the new master terminal is retrieved from the aforementioned storage area (step S175), and on the basis of this network configuration information, control for establishing links with the slave terminals 10A-3, 10A-4 (the terminals which are capable of becoming slave terminals in relation to the new master terminal 10A-2) is performed through the short range radio communication unit 11 (step S176). Thus, by means of short range radio communication, a network with a star connection in which the radio communication device 10A-2 is set to operate as master terminal and the radio communication devices 10A-3, 10A-4 are set as slave terminals is reconstructed.

Thereafter, the new master terminal 10A-2 uses the short range radio communication unit 11 to perform message exchange (communication) with the short range radio communication units 11 of the slave terminals 10A-3, 10A-4 (step S177).

Figure 18:
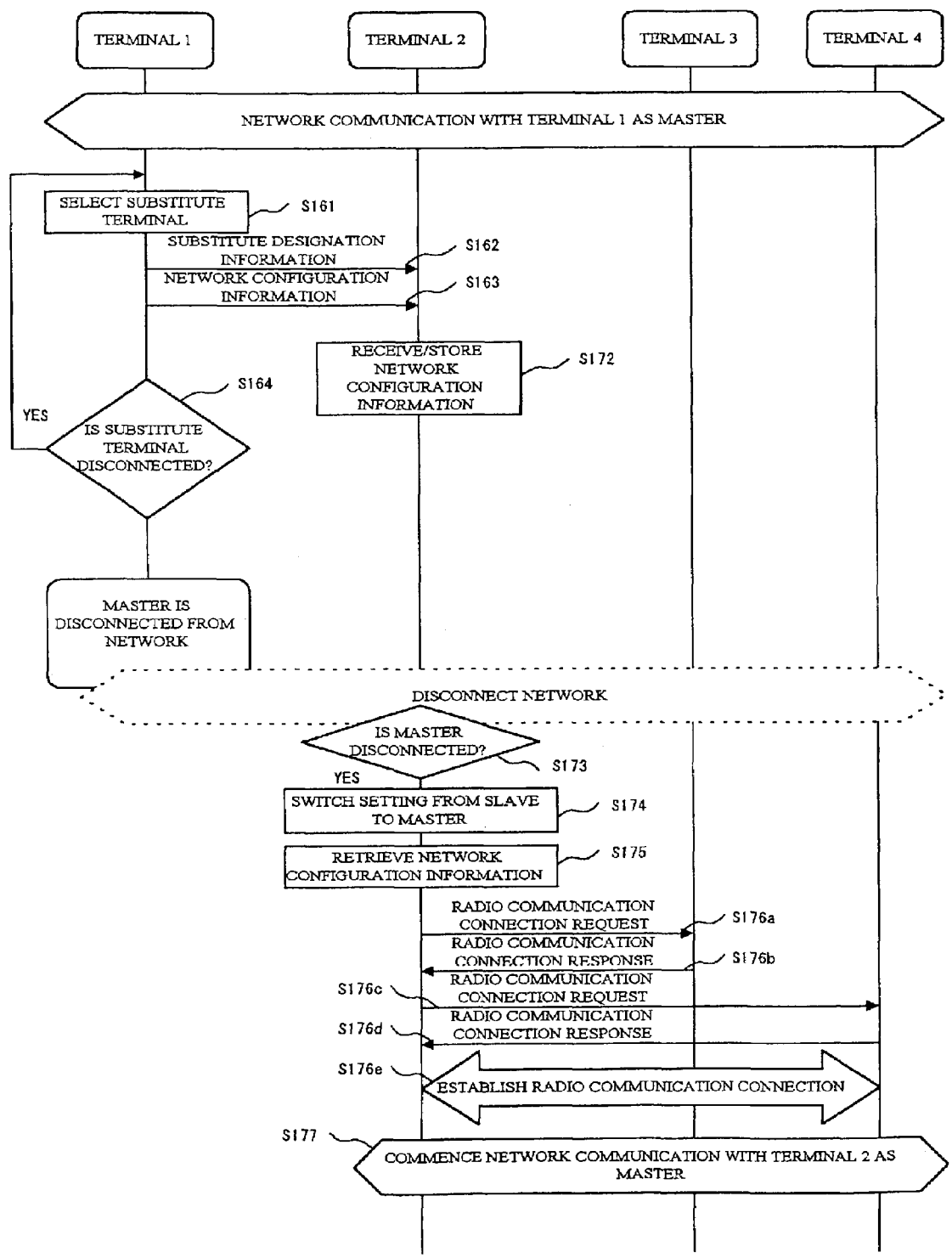
FIG. 18 is a view illustrating a communication mode switching control sequence according to the ninth embodiment.

FIG. 18 is a view showing a communication mode switching control sequence according to the ninth embodiment.

In FIG. 18, each processing step S161, S162 . . . corresponds to the processing step of the same number in the flowcharts in FIGS. 16 and 17.

In the ninth embodiment in FIG. 18, a network is initially connected with terminal 1 as master terminal and terminals 2, 3, 4 as slave terminals. Here, terminals 1, 2, 3, 4 use radio communication devices 10A having the configuration illustrated in FIG. 15.

During communication in a network with terminal 1 as master terminal, the master terminal selects a substitute terminal (step S161) and transmits to this terminal substitute designation information designating the selected terminal, for example terminal 2, as the substitute terminal (step S162). The master terminal then transmits thereto network configuration information indicating the configuration of the current network (step S163).

Next, the master terminal monitors whether or not terminal 2, which has been designated as the substitute terminal, has become disconnected from the network (step S164), and if the substitute terminal has become disconnected (YES in S164), selects another substitute terminal and performs control to transmit substitute designation information and network configuration information to this substitute terminal (steps S161 to S163).

In so doing, the master terminal may ensure at all times the existence of a terminal which will operate as a substitute master terminal when the master terminal itself becomes disconnected from the network.

Meanwhile, terminal 2, which has been selected as the substitute terminal, receives the substitute designation information and network configuration information transmitted by the master terminal and stores this information in the memory unit 33 (step S172).

Thereafter, when the master terminal is disconnected from the network due to the above-described reasons (i.e., communication disable situations caused by the master terminal's moving to outside of the network communication range of the network or the master terminal's power turned off) and this disconnection of the master terminal from the network is detected (YES in step S173), terminal 2 switches settings from slave terminal to master terminal (step S174), thereby becoming the new master terminal. Terminal 2 then retrieves the network configuration information (step S175) and performs control to construct a new network with the other slave terminals.

In this control, the substitute terminal 2, which has become the new master terminal, exchanges radio communication connection requests and responses regarding radio communication connections with network-forming terminals 3 and 4 (steps S176a to 176d) and establishes links with these terminals 3, 4 (step S176e). Once these links have been established, communication commences in a network with terminal 2 as master terminal (step S177).

Figure 19:
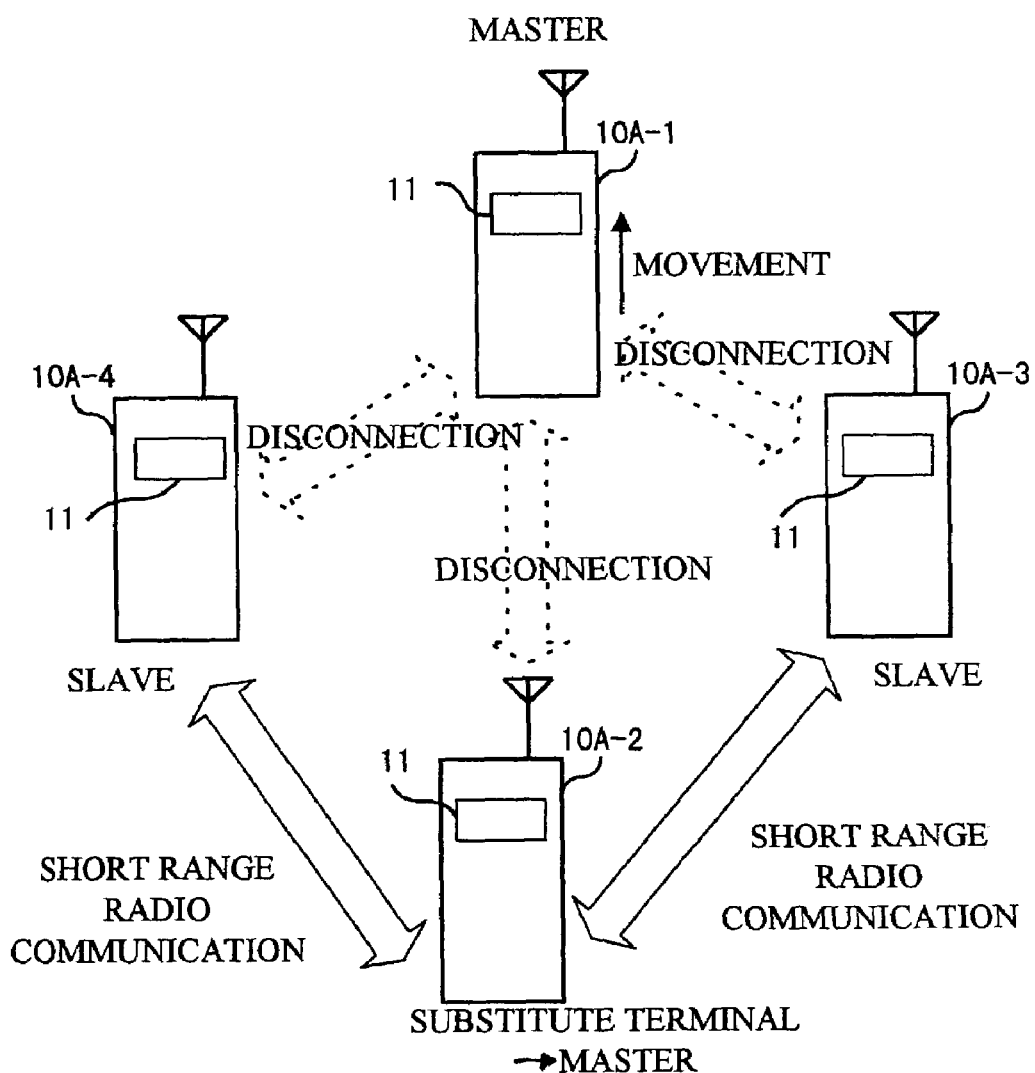
FIG. 19 is a view illustrating an image of a network reconstruction operation following the disconnection of the master terminal in a radio communication system according to the ninth embodiment.

FIG. 19 is a view illustrating an image of a network reconstruction operation when, in the network configuration shown in FIG. 14, the master terminal 10A-1 becomes disconnected from the network following designation by the master terminal 10A-1 of the slave terminal 10A-2 as the substitute master terminal.

In this case, the substitute terminal slave terminal 10A-2 detects the disconnection of the master terminal 10A-1 up to that point from the network, then becoming master terminal and reconstructing the network by establishing links with the new slave terminals 10A-3 and 10A-4.

In so doing, when the master terminal 10A-1 in the network configuration shown in FIG. 14 becomes disconnected from the network, message exchange between the remaining slave terminals 10A-2, 10A-3, 10A-4 can be continued between the slave terminal 10A-2 as the new master terminal and the slave terminals 10A-3, 10A-4.

Thus, in a communication network for performing real time and bidirectional communication through the star connection by means of short range radio communication of a master terminal and slave terminals which are subordinate to this master terminal (see FIG. 14), the radio communication device 10A according to the ninth embodiment (see FIG. 15) comprises a function when operating as master terminal for transmitting to an arbitrary slave terminal substitute designation information designating this slave terminal as a substitute master terminal and network configuration information regarding the current network, a function when operating as slave terminal for receiving this substitute designation information and network configuration information from the master terminal, and a function when the master terminal becomes disconnected from the network following reception of this substitute designation information and network configuration information for switching settings to a function setting for operating as master terminal and establishing links with the other slave terminals on the basis of the received network configuration information.

When radio communication devices 10A having this configuration are disposed on a network and the master terminal becomes disconnected from the network during real time bidirectional communication between master terminal and slave terminals, the terminal designated as substitute by the master terminal becomes the new master terminal and reconstructs the network. As a result, real time bidirectional communication using short range radio communication can be continued among the remaining terminals.

This embodiment may be appropriately altered and these alterations implemented within the scope of the principles thereof.

As is illustrated in FIG. 18 of the aforementioned example, substitute designation information is transmitted to a substitute terminal selected by the master terminal and this terminal is forced to operate as a substitute terminal. However, following transmission of the substitute designation information, the substitute terminal which receives this information may be caused to operate as a substitute terminal only after consent thereto has been obtained.

Further, according to the flowchart in FIG. 16, in the substitute terminal designation control operation performed in the master terminal 10A-1, the substitute terminal (for example the slave terminal 10A-2) is notified of network configuration information regarding the current network only once. As a modified example, however, changes to the current network configuration may be checked during this control operation, and if the configuration of the current network has changed, network configuration information regarding the new changed network may be obtained, and the substitute terminal 10A-2 may be informed of network configuration information regarding the current network including this network configuration information.

As regards the operations on the substitute terminal 10A-2 side in the case of this modified example, when the network configuration information regarding the current network has been received and stored in step S173 during the control operations for switching to master terminal in accordance with the flowchart in FIG. 17, and when a judgment is subsequently made as to whether the new network configuration information has been received and it is judged that the new network configuration information has been received, processing must be performed to update the stored network configuration information with the content of the newly received network configuration information.

As for the configuration of the radio communication device 10A for realizing the functions relating to this modified example, in addition to the configuration shown in FIG. 15, means must be provided when operating as master terminal for: determining whether or not the current network configuration has changed following transmission of substitute designation information designating an arbitrary slave terminal as substitute master terminal; and, if the configuration of the current network has changed, obtaining network configuration information regarding the changed network and transmitting this information to the slave terminal which was the transmission destination of the substitute designation information; and means must be provided when operating as slave terminal for: judging whether or not the new network configuration information has been received following reception of the substitute designation information and network configuration information from the master terminal; and updating the currently stored network configuration information with the content of the newly received network configuration information if the new network configuration information has been received.

Also in this embodiment, following the reconstruction of the network into the configuration shown in FIG. 19, a further continuation of the control to reconstruct the network may be performed by having the new master terminal 10A-2 in this network perform further control for designating either the slave terminal 10A-3 or 10A-4 as the substitute terminal in a similar fashion to the previous master terminal 10A-1 and having the slave terminals 10A-3, 10A-4 receive this designation as substitute terminal from the new master terminal 10A-2.

What is claimed is:

1. A radio communication device which is capable of selectively operating as master terminal and slave terminal, wherein the master terminal forms a network with the slave terminal using a short range radio communication function, comprising:
    a position measuring unit which measures first positional relationship with other radio communication device;
    if operating as master terminal, a switch timing judgment unit which judges timing to take over master terminal to a radio communications device operating as slave terminal based upon the first positional relationship;
    if operating as master terminal, a position information requesting unit which requests each radio communication device operating as slave terminal to provide second positional relationship between the requested radio communication device operating as slave terminal and other radio communication device, and receives the second positional relationship from the radio communication device operating as slave terminal;
    if operating as master terminal, a candidate radio communication device determining unit which selects a radio communication device to be operating as master terminal based upon the second positional relationship from the radio communication device operating as slave terminal; and
    if operating as master terminal, an operating mode switch requesting unit which requests the selected radio communication device to operate as master terminal.

2. A radio communication device which is capable of selectively operation as master terminal and slave terminal, wherein the master terminal forms a network with the slave terminal using a short range radio communication function, comprising,
    a position measuring unit which measures first positional relationship with other radio communication device;
    if operating as master terminal, a switch timing judgment unit which judges timing to take over master terminal to a radio communication device operating as slave terminal based upon the first positional relationship;
    if operating as master terminal, a position information requesting unit which requests each radio communication device operating as slave terminal to provide second positional relationship between the requested radio communication device operating as slave terminal and other radio communication device, and receives the second positional relationship from the radio communication device operating as slave terminal;
    if operating as master terminal, a remaining battery measuring unit which requests a battery information to each radio communication device operating as slave terminal;
    if operating as master terminal, a candidate radio communication device determining unit which selects a radio communication device to be operating as a master terminal based upon the second positional relationship and the battery information; and
    if operating as a master terminal, an operating mode switch requesting unit which requests the selected radio communication device to operate as master terminal.

3. A radio communication device which is capable of selectively operating as master terminal and slave terminal, wherein the master terminal forms a network with the slave terminal using a short range radio communication function, comprising:
    a position measuring unit which measures first positional relationship with other radio communication device;
    if operating as master terminal, a switch timing judgment unit which judges timing to rake over master terminal to a radio communication device operating as slave terminal based upon the measured positional relationship;
    if operating as master terminal, a position information requesting unit which requests each radio communication device operating as slave terminal to provide second positional relationship between the requested radio communication device operating as slave terminal and other radio communication device, and receives the second position information from the radio communication device operating as slave terminal;
    if operating as master terminal, a candidate radio communication device determining unit which selects a radio communication device to be operating as master terminal based upon the second position information from the radio communication device operating as slave terminal;

if operating as master terminal, an operating mode switch requesting unit which requests the selected radio communication device to operate as master terminal;

if operating as slave terminal, a position information transmitting unit, which transmits the second positional relationship to the radio communication device operating as master terminal responding to the request which request the position information, and if operating as slave terminal, a communication mode switching unit which switches a operation mode from a mode operating as slave terminal to a mode operating as master.

4. The radio communication device according to claim 3, wherein the first positional relationship indicates distance information between own radio communication device and other radio communication devices.

5. The radio communication device according to claim 3, further comprising:

if operating as slave terminal, remaining battery measuring unit which measures a battery information of a battery attached to own radio communication device; and if operating as slave terminal, a battery information transmitting unit which transmits the battery information measured by the remaining battery measuring unit.

6. The radio communication device according to claim 1, wherein the switch timing judgment unit judges that it is time to switch communication mode it the radio communication device operating as slave terminal belongs to the network has not been detected.

7. The radio communication device according to claim 1, wherein the second positional relationship received by the position information requesting unit includes the number of radio communication devices included in the communication range of the radio communication device operating as slave terminal, and wherein the candidate radio communication device determining unit determines the radio communication device, which has detected the largest number of radio communication devices, to be operating as master terminal.

8. The radio communication device according to claim 2, wherein the candidate radio communication device determining unit determines the radio communication device which has informed of the battery information containing a greatest battery power.

9. The radio communication device according to claim 1, wherein the second positional relationship received by the position information requesting unit indicates distance information between the radio communication device having been informed of the second positional relationship and other radio communication devices, and wherein the candidate radio communication device determining unit determines the radio communication device to be operating as master terminal based upon the distance information.

10. The radio communication device according to claim 2, wherein the second position relationship received by the position information requesting unit includes the number of radio communication devices included in the communication range of the radio communication device operating as slave terminal and distance information between the radio communication device having been informed of the second positional relationship and other radio communication devices, and wherein the candidate radio communication device determining unit determines the radio communication device to be operating as master terminal based upon the number of radio communication devices and the distance information.

11. The radio communication device according to claim 1, the operating mode switch requesting unit further transmits ID information of the radio communication devices belong to the network formed by own radio communication device after receiving the consent information from the selected radio communication device and disconnects the network after transmitting the ID information.

12. The radio communication device according to claim 3, wherein the communication mode switching unit switches the operation mode to the mode operating as master terminal after the radio communication device operating as master terminal has been disconnected.

13. A radio communication device which is capable of selectively operating as master terminal and slave terminal, wherein the master terminal forms a network with the slave terminal using a short range radio communication function, comprising:

if operating as master terminal, a substitute terminal determining unit which selects, at any timing, a destination radio communication device operating as slave terminal to which substitute designation information designating to operate as substitute master terminal is to be transmitted;

if operating as master terminal, a substitute designation information transmitting unit which transmits the substitute designation information to the destination radio communication device; and if operating as master terminal, a configuration information transmitting unit which transmits network configuration information regarding a current network to the destination radio communication device;

if operating as slave terminal, a reception unit which receives the substitute designation information and the network configuration information from the radio communication device operating as master terminal;

if operating as slave terminal, a disconnection detecting unit which detects disconnection of the radio communication device operating as master terminal from the network flowing the reception of the substitute designation information and the network configuration information; and if operating as slave terminal, a communication mode switching unit which switches settings from a function setting for operating as slave terminal to a function setting for operating as master terminal when the disconnection of the radio communication device operating as master terminal from the network is detected by the disconnection detecting unit, whereby a communication mode is switched to operating its master terminal.

14. The radio communication device according to claim 13, further comprising, if operating as master terminal, a disconnection detecting unit which detects whether or not the destination radio communication device to which the substitute designation information is transmitted is disconnected, wherein the substitute designation information transmitting unit selects, if the disconnection of the destination radio communication device is detected, a radio communication device operating as slave terminal other than the disconnected destination radio communication device and transmit the substitute designation information to the selected radio communication device.

15. The radio communication device according to claim 13, further comprising:
- a remaining battery power measuring unit which measures remaining battery power of the radio communication device; and
- a battery information processing unit which, if the radio communication device operates as master terminal, requests a radio communication device operating as slave terminal that constitutes the network to notify battery information indicating remaining battery power of the radio communication device operating as slave terminal and receives the battery information thus notified, and which, if the radio communication device operates as slave terminal, transmits battery information indicating a remaining battery power of the slave terminal to the radio communication device operating as master terminal according to a notification request from the radio communication device operating as master terminal, wherein the substitute terminal determining unit selects the destination radio communication to which the substitute designation information is to be transmitted based on the battery information.

16. The radio communication device according to claim 13, further comprising:
- a remaining memory capacity measuring unit which measures remaining memory capacity of the radio communication device;
- a memory information processing unit which, if the radio communication device operates as master terminal, requests a radio communication device operating as slave terminal that constitutes the network to notify memory information indicating remaining memory capacity of the radio communication device operating as slave terminal and receives the memory information thus notified, and which, if the radio communication device operates as slave terminal, transmits memory information indicating a remaining memory capacity of the slave terminal to the radio communication device operating as master terminal according to a notification request from the radio communication device operating as master terminal, wherein the substitute terminal determining unit selects the destination radio communication to which the substitute designation information is to be transmitted based on the memory information.

* * * * *